(12) United States Patent
Sengoku

(10) Patent No.: US 9,426,082 B2
(45) Date of Patent: Aug. 23, 2016

(54) LOW-VOLTAGE DIFFERENTIAL SIGNALING OR 2-WIRE DIFFERENTIAL LINK WITH SYMBOL TRANSITION CLOCKING

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 172 days.

(21) Appl. No.: 14/577,897

(22) Filed: Dec. 19, 2014

(65) Prior Publication Data

US 2015/0195211 A1    Jul. 9, 2015

Related U.S. Application Data

(60) Provisional application No. 61/923,456, filed on Jan. 3, 2014.

(51) Int. Cl.
| | |
|---|---|
| H04B 1/38 | (2015.01) |
| H04L 12/801 | (2013.01) |
| H04L 7/033 | (2006.01) |
| H04L 25/49 | (2006.01) |
| H04L 25/493 | (2006.01) |

(52) U.S. Cl.
CPC .............. *H04L 47/34* (2013.01); *H04L 7/033* (2013.01); *H04L 25/493* (2013.01); *H04L 25/4906* (2013.01)

(58) Field of Classification Search
CPC ........................ H04M 11/06; H04M 11/062

USPC ......................................................... 375/222
See application file for complete search history.

(56) References Cited

U.S. PATENT DOCUMENTS 7,308,048 B2    12/2007  Wei
7,447,971 B2 *  11/2008  Sherlock .................. 714/751
(Continued)

FOREIGN PATENT DOCUMENTS

WO    WO-2008109478 A2    9/2008
WO    WO-2008151251 A1    12/2008

OTHER PUBLICATIONS

International Search Report and Written Opinion—PCT/US2014/071958—ISA/EPO—Apr. 2, 2015.

*Primary Examiner* — Santiago Garcia
(74) *Attorney, Agent, or Firm* — Loza & Loza, LLP

(57) ABSTRACT

Systems, methods and apparatus are described for use in a communications link having a number of connectors. A method for communication using differential signaling with symbol transition clocking signaling communicates symbols over a communications link without transmitting a clock signal in a dedicated lane of the communications link. At a receiver, clock information may be extracted without using a phase-locked loop. The method includes converting data bits into a plurality of transition numbers, converting the plurality of transition numbers into a sequence of symbols, and transmitting the sequence of symbols over a plurality of signal wires. A clock signal may be embedded in transitions between consecutive symbols in the sequence of symbols. Each consecutive pair of transition numbers in the plurality of transition numbers may include two transition numbers that are different from one another. The sequence of symbols may be transmitted as a plurality of differential signals.

30 Claims, 25 Drawing Sheets

(56) References Cited

U.S. PATENT DOCUMENTS

| | | | |
|---|---|---|---|
| 7,613,263 B2* | 11/2009 | Allen | 375/355 |
| 8,081,705 B2* | 12/2011 | Kirkpatrick | 375/288 |
| 2001/0033621 A1* | 10/2001 | Khayrallah | 375/244 |
| 2004/0081258 A1* | 4/2004 | Li et al. | 375/329 |
| 2005/0105652 A1* | 5/2005 | Lin et al. | 375/329 |
| 2005/0141661 A1 | 6/2005 | Renaud et al. | |
| 2005/0175124 A1* | 8/2005 | Goldstein et al. | 375/330 |
| 2007/0036555 A1* | 2/2007 | Chen et al. | 398/188 |
| 2009/0092212 A1 | 4/2009 | Ko | |
| 2010/0135335 A1* | 6/2010 | Matsumoto et al. | 370/503 |
| 2010/0290505 A1* | 11/2010 | Nagano et al. | 375/143 |
| 2011/0164624 A1* | 7/2011 | Kelleher et al. | 370/475 |
| 2011/0196997 A1* | 8/2011 | Ruberg et al. | 710/71 |
| 2011/0268258 A1* | 11/2011 | Alloin et al. | 379/32.04 |
| 2012/0028570 A1* | 2/2012 | Sun et al. | 455/9 |
| 2012/0069916 A1* | 3/2012 | Berscheid et al. | 375/259 |
| 2012/0176156 A1* | 7/2012 | Chang et al. | 326/62 |
| 2012/0195401 A1* | 8/2012 | Becker | 375/368 |
| 2013/0290766 A1* | 10/2013 | Nguyen et al. | 713/400 |
| 2014/0185657 A1* | 7/2014 | Arambepola et al. | 375/222 |
| 2014/0254732 A1* | 9/2014 | Sengoku et al. | 375/360 |
| 2014/0270026 A1 | 9/2014 | Sengoku et al. | |

\* cited by examiner

Bits to m x T: Converts binary number (Bits) to m symbol transition numbers (m x T)

T to S: Converts sequential symbol transition number (T) to numbered symbol (Cs)

T utilization: n=2, radix=3 (=$2^2$-1)

T utilization: n=3, radix=7 (=2³-1)

T utilization: n=3, radix=6
(=2³-2, dumping 1 state)

| n | Utilization % | Symbol/group | bits/group | m(bpg) | bits/cycle | bits/lane |
|---|---|---|---|---|---|---|
| 3 | 99.94 | 24 | 62.0591 | 62 | 2.5833 | 0.8611 |
| 3 | 99.94 | 12 | 31.0296 | 31 | 2.5833 | 0.8611 |
| 3 | 99.83 | 31 | 80.1338 | 80 | 2.5806 | 0.8602 |
| 3 | 99.77 | 19 | 49.1143 | 49 | 2.5789 | 0.8596 |
| 3 | 99.69 | 26 | 67.2088 | 67 | 2.5769 | 0.8590 |
| 3 | 99.48 | 28 | 72.3790 | 72 | 2.5714 | 0.8571 |
| 3 | 99.48 | 21 | 54.2842 | 54 | 2.5714 | 0.8571 |
| 3 | 99.48 | 14 | 36.1895 | 36 | 2.5714 | 0.8571 |
| 3 | 99.48 | 7 | 18.0947 | 18 | 2.5714 | 0.8571 |
| 3 | 99.29 | 30 | 77.5459 | 77 | 2.5667 | 0.8556 |
| 3 | 99.24 | 23 | 59.4541 | 59 | 2.5652 | 0.8551 |
| 3 | 99.13 | 32 | 82.7188 | 82 | 2.5625 | 0.8542 |
| 3 | 99.13 | 16 | 41.3594 | 41 | 2.5625 | 0.8542 |
| 3 | 99.03 | 25 | 64.6241 | 64 | 2.5600 | 0.8533 |
| 3 | 98.86 | 27 | 69.7940 | 69 | 2.5556 | 0.8519 |
| 3 | 98.86 | 18 | 46.5293 | 46 | 2.5556 | 0.8519 |
| 3 | 98.86 | 9 | 23.2647 | 23 | 2.5556 | 0.8519 |
| 3 | 98.71 | 29 | 74.9639 | 74 | 2.5517 | 0.8506 |
| 3 | 98.65 | 20 | 51.6993 | 51 | 2.5500 | 0.8500 |
| 3 | 98.47 | 22 | 56.8692 | 56 | 2.5455 | 0.8485 |
| 3 | 98.47 | 11 | 28.4346 | 28 | 2.5455 | 0.8485 |
| 3 | 98.20 | 13 | 33.6045 | 33 | 2.5385 | 0.8462 |
| 3 | 98.00 | 15 | 38.7744 | 38 | 2.5333 | 0.8444 |
| 3 | 97.85 | 17 | 43.9444 | 43 | 2.5294 | 0.8431 |
| 3 | 97.85 | 10 | 25.8496 | 25 | 2.5294 | 0.8431 |
| 3 | 96.71 | 8 | 20.6797 | 20 | 2.5000 | 0.8333 |
| 3 | 96.71 | 6 | 15.5098 | 15 | 2.5000 | 0.8333 |
| 3 | 96.71 | 4 | 10.3399 | 10 | 2.5000 | 0.8333 |
| 3 | 96.71 | 2 | 5.1699 | 5 | 2.5000 | 0.8333 |
| 3 | 92.84 | 5 | 12.9248 | 12 | 2.4000 | 0.8000 |
| 3 | 90.22 | 3 | 7.7549 | 7 | 2.3333 | 0.7778 |
| 3 | 77.37 | 1 | 2.5850 | 2 | 2.0000 | 0.6667 |

T utilization: n=4, radix=15 (=$2^4$-1)

| n | Utilization % | Symbol/group | bits/group | m(bps) | bits/cycle | bits/lane |
|---|---|---|---|---|---|---|
| 4 | 99.98 | 32 | 125.0205 | 125 | 3.9062 | 0.9766 |
| 4 | 99.95 | 21 | 82.0447 | 82 | 3.9048 | 0.9762 |
| 4 | 99.91 | 31 | 121.1136 | 121 | 3.9032 | 0.9758 |
| 4 | 99.82 | 30 | 117.2067 | 117 | 3.9000 | 0.9750 |
| 4 | 99.82 | 20 | 78.1378 | 78 | 3.9000 | 0.9750 |
| 4 | 99.82 | 10 | 39.0689 | 39 | 3.9000 | 0.9750 |
| 4 | 99.74 | 29 | 113.2998 | 113 | 3.8966 | 0.9741 |
| 4 | 99.69 | 19 | 74.2309 | 74 | 3.8947 | 0.9737 |
| 4 | 99.64 | 28 | 109.3929 | 109 | 3.8929 | 0.9732 |
| 4 | 99.54 | 27 | 105.4860 | 105 | 3.8889 | 0.9722 |
| 4 | 99.54 | 18 | 70.3240 | 70 | 3.8889 | 0.9722 |
| 4 | 99.54 | 9 | 35.1620 | 35 | 3.8889 | 0.9722 |
| 4 | 99.43 | 26 | 101.5792 | 101 | 3.8846 | 0.9712 |
| 4 | 99.37 | 17 | 66.1171 | 66 | 3.8824 | 0.9706 |
| 4 | 99.31 | 25 | 97.6723 | 97 | 3.8800 | 0.9700 |
| 4 | 99.18 | 24 | 93.7654 | 93 | 3.8750 | 0.9688 |
| 4 | 99.18 | 16 | 62.5102 | 62 | 3.8750 | 0.9688 |
| 4 | 99.18 | 8 | 31.2551 | 31 | 3.8750 | 0.9688 |
| 4 | 99.04 | 23 | 89.8585 | 89 | 3.8696 | 0.9674 |
| 4 | 98.97 | 15 | 58.6034 | 58 | 3.8667 | 0.9667 |
| 4 | 98.89 | 22 | 85.9516 | 85 | 3.8636 | 0.9659 |
| 4 | 98.73 | 14 | 54.6985 | 54 | 3.8571 | 0.9643 |
| 4 | 98.73 | 7 | 27.3482 | 27 | 3.8571 | 0.9643 |
| 4 | 98.45 | 13 | 50.7896 | 50 | 3.8462 | 0.9615 |
| 4 | 98.12 | 12 | 46.8827 | 46 | 3.8333 | 0.9583 |
| 4 | 98.12 | 6 | 23.4413 | 23 | 3.8333 | 0.9583 |
| 4 | 97.73 | 11 | 42.8758 | 42 | 3.8182 | 0.9545 |
| 4 | 97.26 | 5 | 19.5345 | 19 | 3.8000 | 0.9500 |
| 4 | 96.98 | 4 | 15.6276 | 15 | 3.7500 | 0.9375 |
| 4 | 93.85 | 3 | 11.7207 | 11 | 3.6667 | 0.9167 |
| 4 | 89.59 | 2 | 7.8138 | 7 | 3.5000 | 0.8750 |
| 4 | 76.79 | 1 | 3.9069 | 3 | 3.0000 | 0.7500 |

1500

T utilization: n=4, radix=14
(=2⁴-2, dumping 1 state)

*FIG. 16*

| n | Utilization % | Symbol/group | bits/group | m(bps) | bits/cycle | bits/lane |
|---|---|---|---|---|---|---|
| 4 | 99.98 | 31 | 118.0280 | 118 | 3.8065 | 0.9516 |
| 4 | 99.81 | 30 | 114.2286 | 114 | 3.8000 | 0.9500 |
| 4 | 99.81 | 25 | 95.1899 | 95 | 3.8000 | 0.9500 |
| 4 | 99.81 | 20 | 76.1471 | 76 | 3.8000 | 0.9500 |
| 4 | 99.81 | 15 | 57.1100 | 57 | 3.8000 | 0.9500 |
| 4 | 99.81 | 10 | 38.0733 | 38 | 3.8000 | 0.9500 |
| 4 | 99.81 | 5 | 19.0368 | 19 | 3.8000 | 0.9500 |
| 4 | 99.63 | 29 | 110.4133 | 110 | 3.7931 | 0.9483 |
| 4 | 99.59 | 24 | 91.3766 | 91 | 3.7907 | 0.9479 |
| 4 | 99.53 | 19 | 72.3397 | 72 | 3.7895 | 0.9474 |
| 4 | 99.43 | 28 | 106.6059 | 106 | 3.7857 | 0.9464 |
| 4 | 99.43 | 14 | 53.3030 | 53 | 3.7857 | 0.9464 |
| 4 | 99.35 | 23 | 87.5692 | 87 | 3.7826 | 0.9457 |
| 4 | 99.31 | 32 | 121.8354 | 121 | 3.7812 | 0.9453 |
| 4 | 99.22 | 27 | 102.7986 | 102 | 3.7778 | 0.9444 |
| 4 | 99.22 | 18 | 68.5324 | 68 | 3.7778 | 0.9444 |
| 4 | 99.22 | 9 | 34.2662 | 34 | 3.7778 | 0.9444 |
| 4 | 99.09 | 22 | 83.7618 | 83 | 3.7727 | 0.9432 |
| 4 | 99.00 | 26 | 98.9912 | 98 | 3.7692 | 0.9423 |
| 4 | 99.00 | 13 | 49.4956 | 49 | 3.7692 | 0.9423 |
| 4 | 98.80 | 17 | 64.7250 | 64 | 3.7647 | 0.9412 |
| 4 | 98.61 | 21 | 79.9545 | 79 | 3.7619 | 0.9405 |
| 4 | 98.50 | 20 | 60.9177 | 60 | 3.7500 | 0.9375 |
| 4 | 98.49 | 12 | 45.6883 | 45 | 3.7500 | 0.9375 |
| 4 | 98.49 | 8 | 30.4588 | 30 | 3.7500 | 0.9375 |
| 4 | 98.49 | 4 | 15.2294 | 15 | 3.7500 | 0.9375 |
| 4 | 97.98 | 11 | 41.8809 | 41 | 3.7273 | 0.9318 |
| 4 | 97.56 | 7 | 26.6515 | 26 | 3.7143 | 0.9286 |
| 4 | 96.30 | 6 | 22.8441 | 22 | 3.6667 | 0.9167 |
| 4 | 96.30 | 3 | 11.4221 | 11 | 3.6667 | 0.9167 |
| 4 | 93.83 | 2 | 7.6147 | 7 | 3.5000 | 0.8750 |
| 4 | 76.79 | 1 | 3.8074 | 3 | 3.0000 | 0.7500 |

1600

T utilization: n=5, radix=31 (=$2^5$-1)

| n | Utilization % | Symbol/group | bits/group | inf(bpg) | bits/cycle | bits/lane |
|---|---|---|---|---|---|---|
| 5 | 99.96 | 21 | 104.0381 | 104 | 4.9524 | 0.9905 |
| 5 | 99.92 | 20 | 99.0939 | 99 | 4.9500 | 0.9900 |
| 5 | 99.86 | 19 | 94.1297 | 94 | 4.9474 | 0.9895 |
| 5 | 99.80 | 18 | 89.1755 | 89 | 4.9444 | 0.9889 |
| 5 | 99.74 | 17 | 84.2213 | 84 | 4.9412 | 0.9882 |
| 5 | 99.66 | 32 | 158.5343 | 158 | 4.9375 | 0.9875 |
| 5 | 99.66 | 16 | 79.2671 | 79 | 4.9375 | 0.9875 |
| 5 | 99.62 | 31 | 153.5801 | 153 | 4.9355 | 0.9871 |
| 5 | 99.58 | 30 | 148.6259 | 148 | 4.9333 | 0.9867 |
| 5 | 99.58 | 15 | 74.3129 | 74 | 4.9333 | 0.9867 |
| 5 | 99.53 | 29 | 143.6717 | 143 | 4.9310 | 0.9862 |
| 5 | 99.48 | 28 | 138.7175 | 138 | 4.9286 | 0.9857 |
| 5 | 99.48 | 14 | 69.3587 | 69 | 4.9286 | 0.9857 |
| 5 | 99.43 | 27 | 133.7633 | 133 | 4.9259 | 0.9852 |
| 5 | 99.37 | 26 | 128.8091 | 128 | 4.9231 | 0.9846 |
| 5 | 99.37 | 13 | 64.4046 | 64 | 4.9231 | 0.9846 |
| 5 | 99.31 | 25 | 123.8549 | 123 | 4.9200 | 0.9840 |
| 5 | 99.24 | 24 | 118.9107 | 118 | 4.9167 | 0.9833 |
| 5 | 99.24 | 12 | 59.4504 | 59 | 4.9167 | 0.9833 |
| 5 | 99.17 | 23 | 113.9465 | 113 | 4.9130 | 0.9826 |
| 5 | 99.09 | 22 | 108.9923 | 108 | 4.9091 | 0.9818 |
| 5 | 99.09 | 11 | 54.4962 | 54 | 4.9091 | 0.9818 |
| 5 | 98.91 | 10 | 49.5420 | 49 | 4.9000 | 0.9800 |
| 5 | 98.68 | 9 | 44.5878 | 44 | 4.8889 | 0.9778 |
| 5 | 98.40 | 8 | 39.6336 | 39 | 4.8750 | 0.9750 |
| 5 | 98.04 | 7 | 34.6794 | 34 | 4.8571 | 0.9714 |
| 5 | 97.56 | 6 | 29.7252 | 29 | 4.8333 | 0.9667 |
| 5 | 96.89 | 5 | 24.7710 | 24 | 4.8000 | 0.9600 |
| 5 | 95.88 | 4 | 19.8168 | 19 | 4.7500 | 0.9500 |
| 5 | 94.20 | 3 | 14.8626 | 14 | 4.6667 | 0.9333 |
| 5 | 90.83 | 2 | 9.9084 | 9 | 4.5000 | 0.9000 |
| 5 | 80.74 | 1 | 4.9542 | 4 | 4.0000 | 0.8000 |

T utilization: n=5, radix=30
($=2^5-2$, dumping 1 state)

| n | Utilization % | Symbol/group | bits/group | m(bpg) | bits/cycle | bits/lane |
|---|---|---|---|---|---|---|
| 5 | 99.99 | 32 | 157.0205 | 157 | 4.9062 | 0.9812 |
| 5 | 99.96 | 21 | 103.0447 | 103 | 4.9048 | 0.9810 |
| 5 | 99.93 | 31 | 152.1136 | 152 | 4.9032 | 0.9806 |
| 5 | 99.86 | 30 | 147.2067 | 147 | 4.9000 | 0.9800 |
| 5 | 99.86 | 20 | 98.1378 | 98 | 4.9000 | 0.9800 |
| 5 | 99.86 | 10 | 49.0689 | 49 | 4.9000 | 0.9800 |
| 5 | 99.79 | 29 | 142.2998 | 142 | 4.8966 | 0.9793 |
| 5 | 99.75 | 19 | 93.2309 | 93 | 4.8947 | 0.9789 |
| 5 | 99.71 | 28 | 137.3929 | 137 | 4.8929 | 0.9786 |
| 5 | 99.63 | 27 | 132.4860 | 132 | 4.8889 | 0.9778 |
| 5 | 99.63 | 18 | 88.3240 | 88 | 4.8889 | 0.9778 |
| 5 | 99.63 | 9 | 44.1620 | 44 | 4.8889 | 0.9778 |
| 5 | 99.55 | 26 | 127.5792 | 127 | 4.8846 | 0.9769 |
| 5 | 99.50 | 17 | 83.4171 | 83 | 4.8824 | 0.9765 |
| 5 | 99.46 | 25 | 122.6723 | 122 | 4.8800 | 0.9760 |
| 5 | 99.35 | 24 | 117.7654 | 117 | 4.8750 | 0.9750 |
| 5 | 99.35 | 16 | 78.5102 | 78 | 4.8750 | 0.9750 |
| 5 | 99.35 | 8 | 39.2551 | 39 | 4.8750 | 0.9750 |
| 5 | 99.24 | 23 | 112.8585 | 112 | 4.8696 | 0.9739 |
| 5 | 99.18 | 15 | 73.6034 | 73 | 4.8667 | 0.9733 |
| 5 | 99.12 | 22 | 107.9516 | 107 | 4.8636 | 0.9727 |
| 5 | 98.99 | 14 | 68.6965 | 68 | 4.8571 | 0.9714 |
| 5 | 98.99 | 7 | 34.3482 | 34 | 4.8571 | 0.9714 |
| 5 | 98.76 | 13 | 63.7896 | 63 | 4.8462 | 0.9692 |
| 5 | 98.50 | 12 | 58.8827 | 58 | 4.8333 | 0.9667 |
| 5 | 98.50 | 6 | 29.4413 | 29 | 4.8333 | 0.9667 |
| 5 | 98.19 | 11 | 53.9758 | 53 | 4.8182 | 0.9636 |
| 5 | 97.82 | 5 | 24.5345 | 24 | 4.8000 | 0.9600 |
| 5 | 96.80 | 4 | 19.6276 | 19 | 4.7500 | 0.9500 |
| 5 | 95.10 | 3 | 14.7207 | 14 | 4.6667 | 0.9333 |
| 5 | 91.71 | 2 | 9.8138 | 9 | 4.5000 | 0.9000 |
| 5 | 81.52 | 1 | 4.9069 | 4 | 4.0000 | 0.8000 |

FIG. 18

T utilization: n=8, radix=255 (=$2^8$-1)

| n | Utilization % | Symbols/group | bits/group | xt(bps) | bits/cycle | bits/lane |
|---|---|---|---|---|---|---|
| 8 | 99.68 | 32 | 255.8183 | 255 | 7.9938 | 0.9961 |
| 8 | 99.67 | 31 | 247.8250 | 247 | 7.9677 | 0.9960 |
| 8 | 99.66 | 30 | 239.8306 | 239 | 7.9667 | 0.9958 |
| 8 | 99.64 | 29 | 231.8362 | 231 | 7.9657 | 0.9957 |
| 8 | 99.62 | 28 | 223.8419 | 223 | 7.9643 | 0.9955 |
| 8 | 99.61 | 27 | 215.8475 | 215 | 7.9630 | 0.9954 |
| 8 | 99.59 | 26 | 207.8532 | 207 | 7.9615 | 0.9952 |
| 8 | 99.57 | 25 | 199.8588 | 199 | 7.9600 | 0.9950 |
| 8 | 99.55 | 24 | 191.8645 | 191 | 7.9583 | 0.9948 |
| 8 | 99.53 | 23 | 183.8701 | 183 | 7.9565 | 0.9946 |
| 8 | 99.50 | 22 | 175.8758 | 175 | 7.9545 | 0.9943 |
| 8 | 99.47 | 21 | 167.8814 | 167 | 7.9524 | 0.9940 |
| 8 | 99.45 | 20 | 159.8871 | 159 | 7.9500 | 0.9938 |
| 8 | 99.41 | 19 | 151.8927 | 151 | 7.9474 | 0.9934 |
| 8 | 99.38 | 18 | 143.8984 | 143 | 7.9444 | 0.9931 |
| 8 | 99.33 | 17 | 135.9040 | 135 | 7.9412 | 0.9926 |
| 8 | 99.29 | 16 | 127.9097 | 127 | 7.9375 | 0.9922 |
| 8 | 99.24 | 15 | 119.9153 | 119 | 7.9333 | 0.9917 |
| 8 | 99.19 | 14 | 111.9209 | 111 | 7.9286 | 0.9911 |
| 8 | 99.11 | 13 | 103.9266 | 103 | 7.9231 | 0.9904 |
| 8 | 99.03 | 12 | 95.9322 | 95 | 7.9167 | 0.9896 |
| 8 | 98.93 | 11 | 87.9379 | 87 | 7.9091 | 0.9886 |
| 8 | 98.82 | 10 | 79.9435 | 79 | 7.9000 | 0.9875 |
| 8 | 98.68 | 9 | 71.9492 | 71 | 7.8889 | 0.9861 |
| 8 | 98.51 | 8 | 63.9548 | 63 | 7.8750 | 0.9844 |
| 8 | 98.28 | 7 | 55.9605 | 55 | 7.8571 | 0.9821 |
| 8 | 97.98 | 6 | 47.9661 | 47 | 7.8333 | 0.9792 |
| 8 | 97.57 | 5 | 39.9718 | 39 | 7.8000 | 0.9750 |
| 8 | 96.94 | 4 | 31.9774 | 31 | 7.7500 | 0.9688 |
| 8 | 95.93 | 3 | 23.9831 | 23 | 7.6667 | 0.9583 |
| 8 | 93.92 | 2 | 15.9887 | 15 | 7.5000 | 0.9375 |
| 8 | 87.50 | 1 | 7.9944 | 7 | 7.0000 | 0.8750 |

T utilization: n=8, radix=254 ($=2^8-2$, dumping 1 state)

| n | Utilization % | Symbol/group | bits/group | m(bpg) | bits/cycle | bits/lane |
|---|---|---|---|---|---|---|
| 8 | 99.75 | 32 | 255.6379 | 255 | 7.9688 | 0.9961 |
| 8 | 99.74 | 31 | 247.6492 | 247 | 7.9677 | 0.9960 |
| 8 | 99.72 | 30 | 239.6605 | 239 | 7.9667 | 0.9958 |
| 8 | 99.71 | 29 | 231.6719 | 231 | 7.9655 | 0.9957 |
| 8 | 99.69 | 28 | 223.6832 | 223 | 7.9643 | 0.9955 |
| 8 | 99.68 | 27 | 215.6945 | 215 | 7.9630 | 0.9954 |
| 8 | 99.66 | 26 | 207.7058 | 207 | 7.9615 | 0.9952 |
| 8 | 99.64 | 25 | 199.7171 | 199 | 7.9600 | 0.9950 |
| 8 | 99.62 | 24 | 191.7284 | 191 | 7.9583 | 0.9948 |
| 8 | 99.60 | 23 | 183.7397 | 183 | 7.9565 | 0.9946 |
| 8 | 99.57 | 22 | 175.7511 | 175 | 7.9545 | 0.9943 |
| 8 | 99.55 | 21 | 167.7624 | 167 | 7.9524 | 0.9940 |
| 8 | 99.52 | 20 | 159.7737 | 159 | 7.9500 | 0.9938 |
| 8 | 99.48 | 19 | 151.7850 | 151 | 7.9474 | 0.9934 |
| 8 | 99.45 | 18 | 143.7963 | 143 | 7.9444 | 0.9931 |
| 8 | 99.41 | 17 | 135.8076 | 135 | 7.9412 | 0.9926 |
| 8 | 99.36 | 16 | 127.8190 | 127 | 7.9375 | 0.9922 |
| 8 | 99.31 | 15 | 119.8303 | 119 | 7.9333 | 0.9917 |
| 8 | 99.25 | 14 | 111.8416 | 111 | 7.9286 | 0.9911 |
| 8 | 99.18 | 13 | 103.8529 | 103 | 7.9231 | 0.9904 |
| 8 | 99.10 | 12 | 95.8642 | 95 | 7.9167 | 0.9896 |
| 8 | 99.00 | 11 | 87.8755 | 87 | 7.9091 | 0.9886 |
| 8 | 98.89 | 10 | 79.8868 | 79 | 7.9000 | 0.9875 |
| 8 | 98.75 | 9 | 71.8982 | 71 | 7.8889 | 0.9861 |
| 8 | 98.58 | 8 | 63.9095 | 63 | 7.8750 | 0.9844 |
| 8 | 98.35 | 7 | 55.9208 | 55 | 7.8571 | 0.9821 |
| 8 | 98.06 | 6 | 47.9321 | 47 | 7.8333 | 0.9792 |
| 8 | 97.64 | 5 | 39.9434 | 39 | 7.8000 | 0.9750 |
| 8 | 97.01 | 4 | 31.9547 | 31 | 7.7500 | 0.9688 |
| 8 | 95.97 | 3 | 23.9661 | 23 | 7.6667 | 0.9583 |
| 8 | 93.88 | 2 | 15.9774 | 15 | 7.5000 | 0.9375 |
| 8 | 87.62 | 1 | 7.9887 | 7 | 7.0000 | 0.8750 |

LOW-VOLTAGE DIFFERENTIAL SIGNALING OR 2-WIRE DIFFERENTIAL LINK WITH SYMBOL TRANSITION CLOCKING

CROSS-REFERENCE TO RELATED APPLICATIONS

This application claims priority to and the benefit of provisional patent application No. 61/923,456, which was filed in the United State Patent Office on Jan. 3, 2014, the entire content of which is incorporated herein by reference.

FIELD

The present disclosure pertains to transmitting and/or encoding a clock signal within cycles of a multi-signal data transfer.

BACKGROUND

The Mobile Industry Processor Interface (MIPI®) Alliance has been defining standards for serial interfaces, including physical layer (PHY) standards that may be used in mobile devices to provide high bandwidth connections between devices and peripherals within mobile devices. The MIPI standards include the D-PHY standard (referred to herein as MIPI D-PHY, or DPHY) that employs a signaling scheme which requires a dedicated clock lane to provide a receiving device with timing information used by a transmitting device to transmit data. The MIPI standards include the M-PHY standard (referred to herein as MIPI M-PHY, or MPHY) that employs a signaling scheme in which the transmitter embeds the timing information in the transmitted data and the receiver extracts the timing information using a phase-locked loop (PLL) to provide a receive clock.

The use of a dedicated clock lane requires using at least one extra conductor and the use of PLLs to extract clocks embedded in the data lanes increases the complexity of the receiver circuitry, particularly when the PLLs must rapidly synchronize on received data signals.

SUMMARY

Systems, methods and apparatus are disclosed herein that use a communications link having a number of connectors. The communications link may be provided between two devices, which may be collocated in an electronic apparatus. Certain aspects of the invention provide an efficient method for embedding clock signals within multi-wire communication interfaces, including communication interfaces that employ differential signaling. In one example, a differential signaling system may be provided that does not require a dedicated clock lane. In another example, receivers may be constructed without a PLL for recovering a clock used to decode data transmitted on the communication interface.

According to certain aspects, a method for multi-wire signaling includes receiving data to be communicated over a communications link using differential signaling, converting the data to a set of transition numbers, selecting sequences of symbols using the transition numbers and transmitting the sequence of symbols over a plurality of lanes in the communications link. Each symbol may correspond to a signaling state of a plurality of lanes on the communications link. Each pair of consecutive symbols in the sequences of symbols may include two different symbols. Transmitting the two different symbols causes a transition in signaling state of at least one lane in the communications link.

In an aspect, clock information is embedded in transitions in signaling state of the plurality of lanes occurring between symbols consecutively transmitted on the communications link. The sequence of symbols may be transmitted as a plurality of signals, each signal being transmitted over one of the plurality of lanes.

In an aspect, each lane include a pair of differential signal wires. The sequence of symbols may be transmitted by providing a differential signal to each lane. The differential signal may correspond to a bit position in each symbol of the sequence of symbols.

In an aspect, the sequence of symbols may be transmitted without transmitting a clock signal in a dedicated or separate lane in the communications link. A signaling lane used as a clock lane in some modes of operation of the communications link may be repurposed to carry a differential signal corresponding to one bit of symbols transmitted on the communications link.

According to certain aspects, an apparatus for multi-wire signaling includes a plurality of differential transmitters adapted to couple the apparatus to a communications link that employs differential signaling, a first convertor that is configured to receive data to be communicated over the communications link and to convert the data to a set of transition numbers, and a second convertor that is configured to select sequences of symbols using the transition numbers. Each sequence of symbols may be provided to the plurality of differential transmitters. Each pair of consecutive symbols in the sequences of symbols may include two different symbols that define different signaling states of the communications link. The differential transmitters may include low voltage differential transmitters.

In an aspect, the second convertor is configured to embed clock information in transitions in signaling state of the communications link by selecting consecutively transmitted pairs of symbols that are different from one another.

In an aspect, the plurality of differential transmitters may include n transmitters configured to produce 2 signaling states such that $2^n$ symbols are available for transmission on the communications link data. The first convertor may be configured encode data using $r=2^n-1$ transition numbers. Each sequence of symbols may include m symbols. Each sequence of symbols may encode data elements that have up to $(2^n-1)^m$ possible states.

In an aspect, each symbol includes a plurality of bits. Each bit may control a signaling state output by one of the plurality of differential transmitters.

In an aspect, the apparatus provides no clock signal in a dedicated clock lane on the communications link. In a different mode of operation, one transmitter of the plurality of differential transmitters carries a clock signal and other transmitters in the plurality of differential transmitters carry signals representative of different bits of the data.

According to certain aspects, a receiving apparatus for multi-wire signaling, includes a plurality of differential receivers configured to provide a sequence of symbols representative of signals received from a plurality of lanes in a differential signaling communications link, a clock recovery circuit adapted to generate a receive clock by detecting transitions in signaling state of the communications link, a first convertor configured to generate a set of transition numbers representative of difference between consecutive symbols in the sequence of symbols, and a second convertor configured to decode data from the set of transition numbers. The transitions in the signaling state of the communications link correspond to transitions between symbols in the sequence of symbols.

In an aspect, edges of the receive clock correspond to transitions between symbols in the sequence of symbols. The receive clock may be used to capture the sequence of symbols. One or more operations of the first convertor and/or one or more operations of the second convertor are controlled by the receive clock.

According to certain aspects, a method for multi-wire signaling includes receiving a sequence of symbols from a plurality of lanes in a differential signaling communications link, extracting a clock corresponding to transitions between consecutive symbols in the sequence of symbols, generating a set of transition numbers, each transition number representative of difference in signaling states of the communications link corresponding to each pair of consecutive sequences of symbols in the sequence of symbols, and converting the set of transition numbers to data. Each pair of consecutive symbols in the sequences of symbols includes two different symbols such the clock includes an edge corresponding to each symbol in the sequence of symbols.

In an aspect, edges of the receive clock correspond to transitions between symbols in the sequence of symbols.

In an aspect, the method includes capturing the sequence of symbols using the receive clock. The first convertor may be controlled using the receive clock. The second convertor may be controlled using the receive clock.

In an aspect, the sequence of symbols may be encoded in a plurality of differential signals, each differential signal being received from a different lane of the communications link.

DRAWINGS

Various features, nature and advantages may become apparent from the detailed description set forth below when taken in conjunction with the drawings in which like reference characters identify correspondingly throughout.

FIG. 12 illustrates a utilization table for a 2-lane, 4-wire differential system that uses all of the 3 available states per symbol for various symbols per group.

FIG. 13 illustrates a utilization table for a 3-lane, 6-wire differential system that uses all of the 7 available states per symbol for various symbols per group.

FIG. 14 illustrates a utilization table for a 3-lane, 6-wire differential system that uses 6 available states per symbol (after reserving 1 state for a special purpose) for various symbols per group.

FIG. 15 illustrates a utilization table for a 4-lane, 8-wire differential system that uses all of the 15 available states per symbol for various symbols per group.

FIG. 16 illustrates a utilization table for a 4-lane, 8-wire differential system that uses 14 available states per symbol (after reserving 1 state for a special purpose) for various symbols per group.

FIG. 17 illustrates a utilization table for a 5-lane, 10-wire differential system that uses all of the 31 available states per symbol for various symbols per group.

FIG. 18 illustrates a utilization table for a 5-lane, 10-wire differential system that uses 30 available states per symbol (after reserving 1 state for a special purpose) for various symbols per group.

FIG. 19 illustrates a utilization table for an 8-lane, 16-wire differential system that uses all of the 255 available states per symbol for various symbols per group.

FIG. 20 illustrates a utilization table for an 8-lane, 16-wire differential system that uses 254 available states per symbol (after reserving 1 state for a special purpose) for at various symbols per group.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

Systems, devices and methods for embedding a dock signal within a communication interface are provided. According to certain aspects disclosed herein, the communication interface nay include a plurality of wires or other connectors. In one example, the plurality of wires may be configured to provide a differential signaling system. In another example, the plurality of wires is configured to provide a single-ended signaling system. In order to simplify descriptions of certain aspects of the invention, some examples are provided that relate to a single-ended signaling system, and other examples are provided that relate to differential signaling systems. It will be appreciated that the selection of examples does not limit the scope of the invention and the principles illustrated with respect to one signaling system may relate equally to other signaling systems.

Multi-Wire Single-Ended Push-Pull Link with Data Transition Based Clocking

Figure 1:
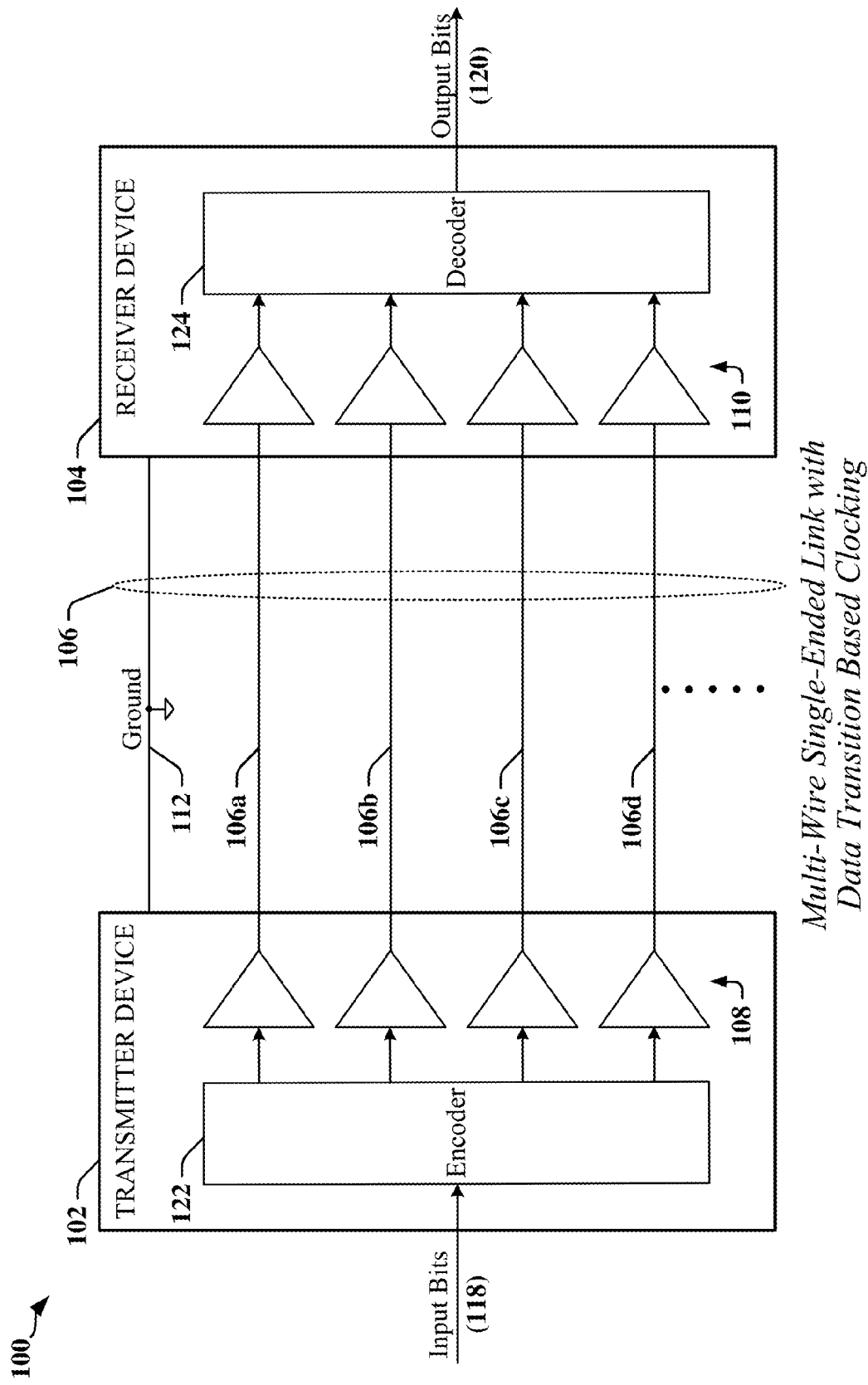
FIG. 1 illustrates a single-ended signaling system.

FIG. 1 illustrates a single-ended signaling system. In single-ended signaling, one wire carries a varying voltage that represents the signal, while another wire may be connected to a reference voltage (e.g., ground). A transmitter device 102 may include one or more single-ended push-pull complementary metal-oxide-semiconductor (CMOS) drivers 108, with each driver 108 being coupled to a single wire/conductor 106a, 106b, 106c, and/or 106d. A receiver device 104 may include one or more single-ended receivers 110, with each single-ended receiver 110 being coupled to a single wire/conductor 106a, 106b, 106c, and/or 106d. The transmitter device 102 receives input bits 118, encodes them (at encoder 122) into single-ended signals, and transmits them to the receiver 104 as single-ended signals through the single-ended drivers 108 via each wire/conductor 106a, 106b, 106c, and/or 106d. The receiver device 104 receives the single-ended signals via each wire/conductor 106a, 106b, 106c, and/or 106d through the single-ended receivers 110, decodes the single-ended signals (at decoder 124), and provides output bits 120. In this single-ended system, the decoder 124 may include a clock and data recovery (CDR) such that a clock signal is extracted from one or more received single-ended signals.

Figure 2:
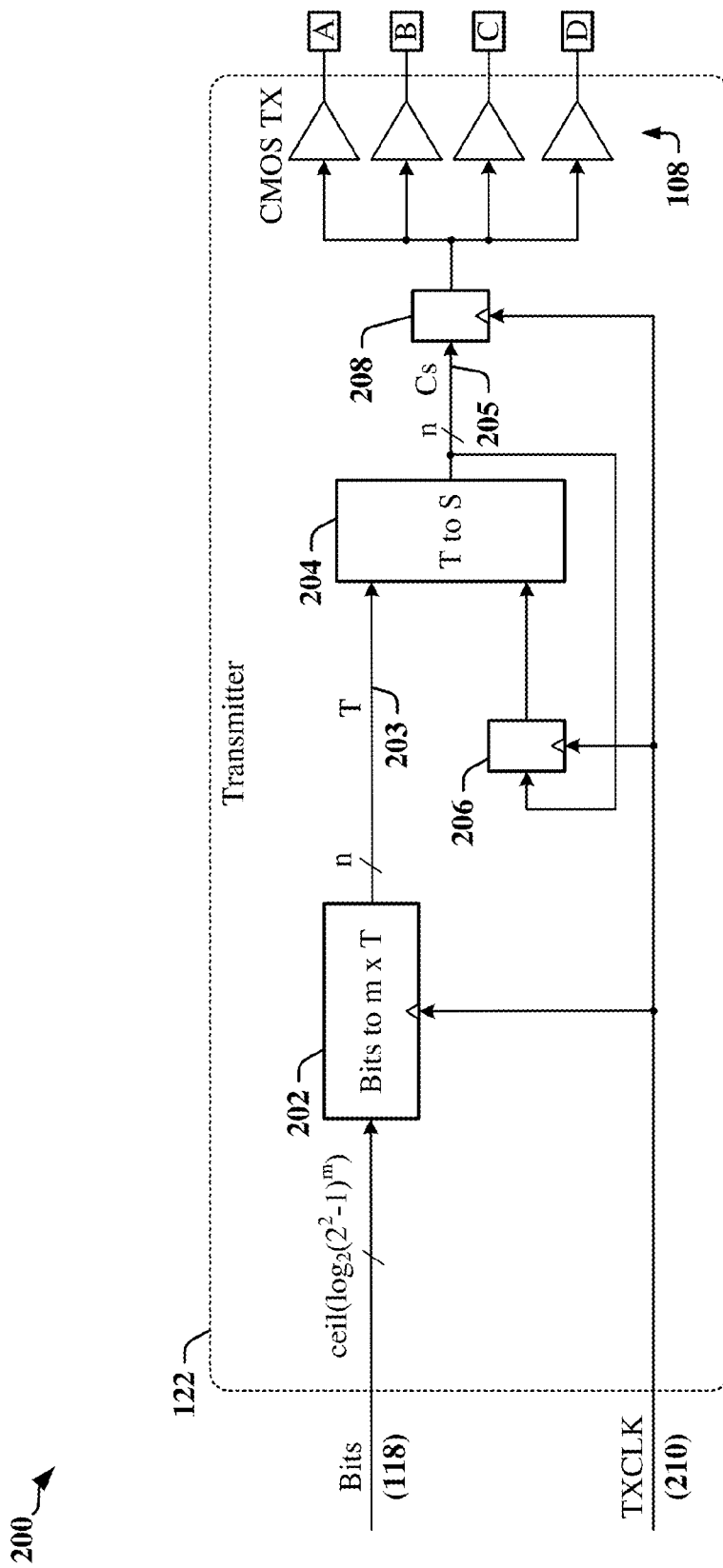
FIG. 2 is a block diagram illustrating an example of a transmitter device.

FIG. 2 is a block diagram illustrating an example of a transmitter device. The encoder 122 may include a bits-to-m×T converter 202 that converts binary formatted data (bits) 118 into m multiple transition numbers, T0, T1, ..., Tm−1. A T-to-S converter 204 then converts the transition number T 203 into a symbol number current state Cs 205. A first flip-flop 206 stores the current state Cs 205 at each symbol clock TXCLK 210, and provides a previous symbol Ps 207 to the T-to-S converter 204. A second flip-flop 208 samples in the current state Cs and generates output state data to the n CMOS type drivers 108.

Figure 3:
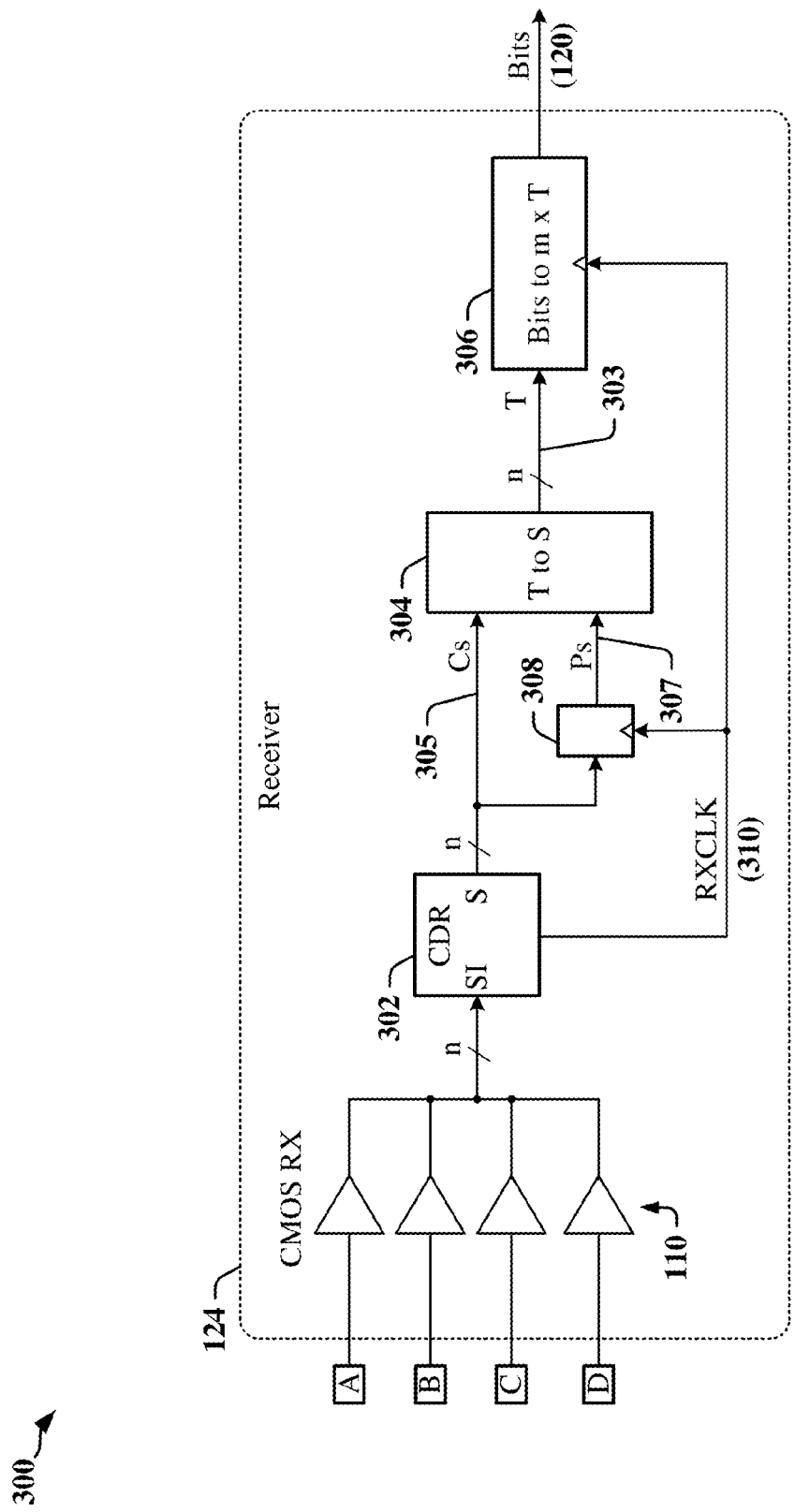
FIG. 3 is a block diagram illustrating an example of a receiver device.

FIG. 3 is a block diagram 300 illustrating an exemplary receiver device. A plurality of n CMOS type single-ended receivers 110 serve to receive data on n-wire channels as symbol input current state Cs 305. A clock and data recovery circuit (CDR) 302 serves to recover a symbol clock RXCLK 310 from the symbol input from the receivers 110, and registers the valid data to be used by the rest of the decoder 124. A plurality of n flip-flops 308 stores the current state Cs 305 at each rising edge of the clock RXCLK 310 and generates a previous state Ps 307. An S-to-T converter 304 generates a sequential transition number 303 by comparing the current state Cs 305 and the previous state Ps 307. A m×T-to-Bits converter 306 converts m multiple transition numbers, T0, T1, ..., Tm−1, into a binary format data to be output as bits 120.

Figure 4:
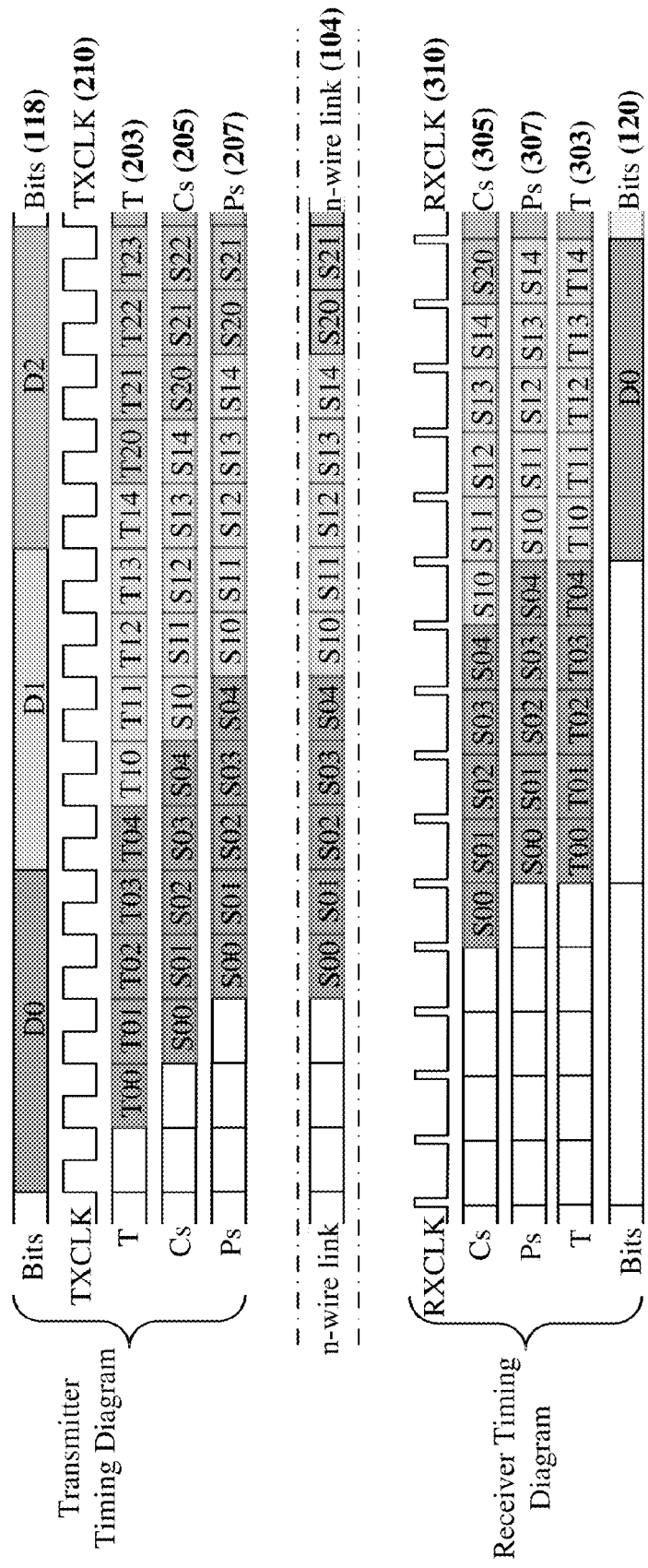
FIG. 4 illustrates a timing diagram corresponding to the transmitter and receiver devices of FIGS. 2 and 3.

FIG. 4 illustrates a timing diagram of the transmitter and receiver devices of FIGS. 2 and 3.

At the transmitter device 102, original input data 118 in bits format, Dn (D0, D1, D2, ...), is converted to multiple numbers of transition numbers, Tn0, Tn1, ..., Tn4 as a signal T 203 by the Bits-to-m×T converter 202 at every rising edge of the transmitter clock signal TXCLK 210. The signal T 203 is converted into the current state Cs (e.g., Sn0, Sn1, Sn2, ..., Sn4) by the T-to-S converter 204. The current state Cs signal is sampled at every rising edge of the transmitter clock signal TXCLK 210, and the n CMOS (push-pull) drivers 108 output the sampled data to the n-wire communication link (e.g., n conductors).

At the receiver device 104, the signal on the n-wire communication link (e.g., n conductors) is received by the n receivers 110 whose output is fed to the clock and data recovery circuit CDR 302 to recover the link clock RXCLK 310, and output valid data at every rising edge of the RXCLK 310 to be fed to the S-to-T converter 304 to convert the each of the symbol states (e.g., Sn0, Sn1, Sn2, ..., Sn4) 305 into transition numbers T 303 (e.g., Tn0, Tn1, ..., Tn4). The transition numbers T 303 (e.g., Tn0, Tn1, ..., Tn4) is fed to the m×T-to-Bits converter 306 to restore the bits information 120.

Figure 5:
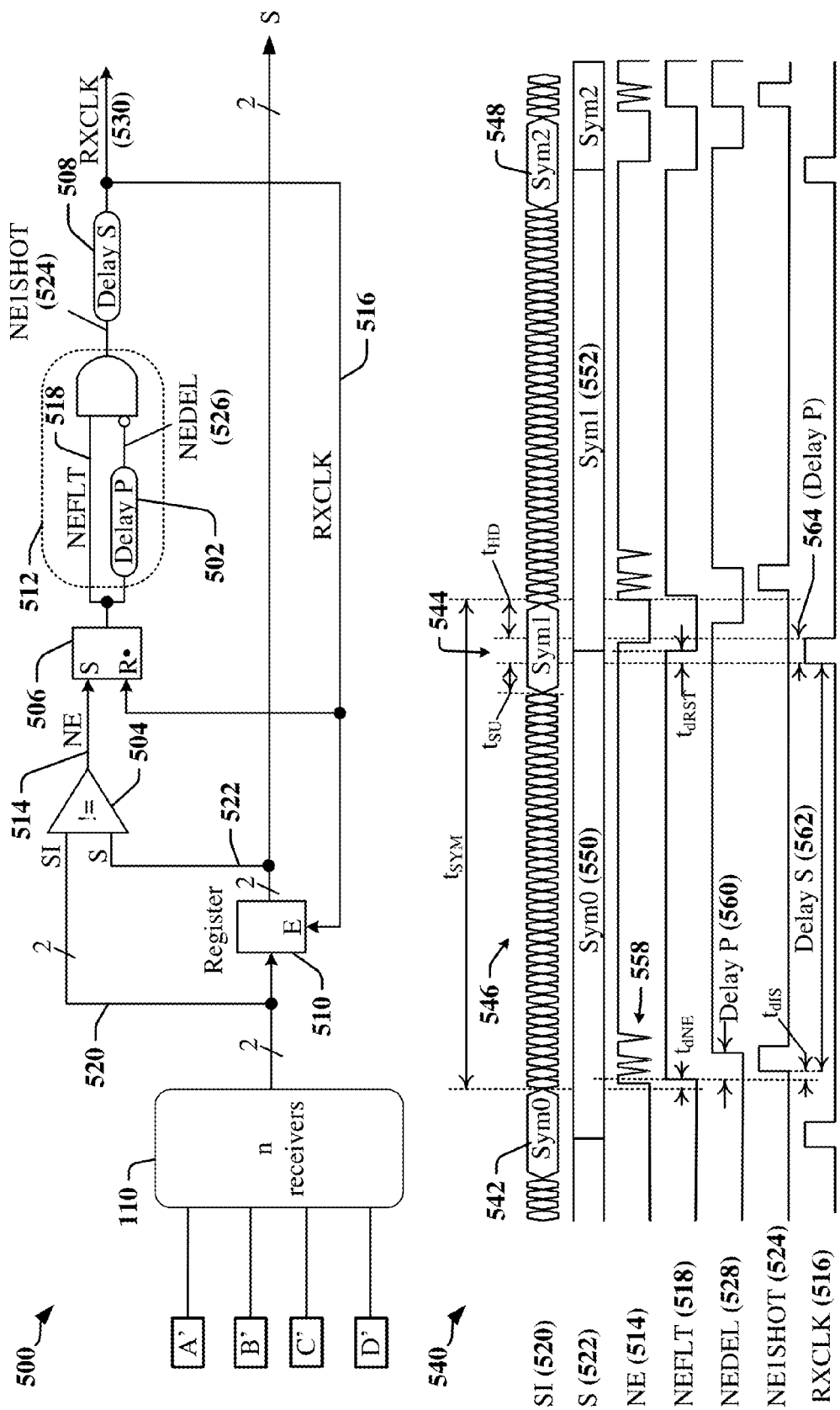
FIG. 5 is a block diagram illustrating one example of a clock and data recovery circuit (CDR) and a corresponding timing diagram.

FIG. 5 includes a block diagram 500 illustrating one example of a clock and data recovery circuit CDR 501 and a corresponding timing diagram 540. This CDR circuit 501 includes a comparator 504, a set-reset register 506, a first delay device/element 502, a one-shot logic 502/503, a second delay device/element 508, and a register 510. The first delay device/element 502 and/or second delay device/element 508 may be either a digital delay or an analog delay. The comparator 504 may compare a first instance of the first state transition signal (SI) and a registered instance of the first state transition signal (S) and outputs a comparison signal (NE signal) 514. The set-reset register 506 may receive the NE signal 514 from the comparator 504 and outputs a filtered version of the comparison signal (NEFLT signal) 518. The first delay device/element 502 may receive the NEFLT signal 518 and output a delayed instance of the filtered version of the comparison signal (NEDEL signal) 526. The one-shot logic 502/503 may receive NEFLT signal 518 and the NEDEL signal 526 and output a second filtered version of the comparison signal (NE1SHOT signal) 524. The second delay device/element 508 may receive the NE1SHOT signal 524 and output a delayed instance of the RXCLK SIGNAL 516. The set-reset register 506 may be reset based on the delayed instance of the RXCLK SIGNAL 516. The register 510 may receive the first state transition signal (SI) and outputs the registered instance of the first state transition signal (5), where the register 510 is triggered based on the delayed instance of the RXCLK SIGNAL 516.

As can be appreciated from the timing diagram 540, the small delay P 502 introduced provides more margins for setup time between symbols.

The following definitions are used in the timing diagram 540 signal:

$t_{sym}$: one symbol cycle period, $t_{SU}$: setup time of SI for the register 510 referenced to the rising (leading) edge of RXCLK SIGNAL 516, $t_{HD}$: hold time of SI for the register 510 referenced to the falling (trailing) edge of RXCLK SIGNAL 516, $t_{dNE}$: propagation delay of the comparator 504, $t_{dRST}$: reset time of the set-reset register 506 from the rising (leading) edge of RXCLK SIGNAL 516, $t_{d1S}$: propagation delay of the one-shot logic 503.

Initially, signals SI and S hold the previous symbol value Sym0 522. The NE signal 514, NEFLT signal 518, and SDRCLK are zero.

When a new symbol value Sym1 544 is being received, it causes signal SI to start changing its value. The SI value may be different from Sym1 544 (valid data) due to the possibility of receiving intermediate or indeterminate states 546 of the signal transition (from Sym0 to Sym1) that may be caused, for example, by inter-wire skew, over/under shoot, cross-talk, etc.

The NE signal 514 becomes high as soon as the comparator 504 detects different value between SI and S, and that (synchronously/asynchronously) sets the set-reset register 506 output, NEFLT signal 518, high after tdNE, which hold its high state until it is reset by a high state of RXCLK SIGNAL 516 which will arrive approximately a Delay period S (caused by delay S 508) after rising of NEFLT signal 518.

The intermediate states 546 at SI (invalid data) may contain a short period of symbol value Sym0 522 causing the NE signal 514 to return low for short periods of time (spikes 558 in the NE signal 514). The low state of the NE signal 514 will not affect the set-reset register 506 output, NEFLT signal 518, since the set-reset register 506 effectively filters out spikes on the NE signal 514 before outputting the NEFLT signal 518.

The one-shot circuit (logic gate 503 with delay P 502) generates a high state on its output, NE1SHOT signal 524, after td1S from rising edge of NEFLT signal 518, and holds the NE1SHOT signal 524 at a high state for the Delay P period 502 before turns it to a low state.

The high state of NE1SHOT signal 524 propagates to the RXCLK signal 516 after a Delay S period 562 caused by the delay S 508.

The high state of RXCLK signal 516 resets the set-reset register 506 output, NEFLT signal 518, to low after tdRST. The high state of RXCLK signal 516 also enables the register 510 for the SI signal 520 value to be output as the S signal 522.

The comparator 504 detects when the S signal (symbol Sym1 552) and matches the symbol Sym 544 of the SI signal 520, and turns its output, the NE signal 514, to low.

The low state of NE1 SHOT signal 524 propagates to the RXCLK signal 516 after a Delay period S 562 caused by the delay S 508.

When a new symbol value Sym2 is being received, it causes the ST signal 520 to start changing its value to the next symbol Sym2 540 after tHD from the last falling (trailing) edge 564 of a pulse on the RXCLK signal 516.

The timing constraint for the symbol cycle period $t_{SYM}$ may be as follows:

$$t_{dNE}+t_{d1S}+\text{Delay }S+\text{Delay }P+t_{HD}<t_{SYM}.$$

More specifically, the symbol cycle time $t_{SYM}$ must be greater than total of: a Delay period S, a Delay Period P, $t_{HD}$, $t_{dNE}$, $t_{d1S}$ and $t_{dRST}$. If the total of these six time periods exceeds the $t_{SYM}$ period, the trailing edge of RXCLK SIGNAL 516 overlaps the next symbol cycle, disabling the NEFLT signal 518 from being set for the overlapping period. Note that the amount of overlapping period accumulates cycle by cycle and eventually results in an extra pulse on the RXCLK signal 516 in one symbol cycle.

The timing constraint for the setup time $t_{SU}$ may be as follows:

$$\text{Max. skew spec}+t_{SU}<\text{Delay }S.$$

More specifically, the delay period S must be less than the setup time $t_{SU}$ plus the maximum skew.

Figure 6:
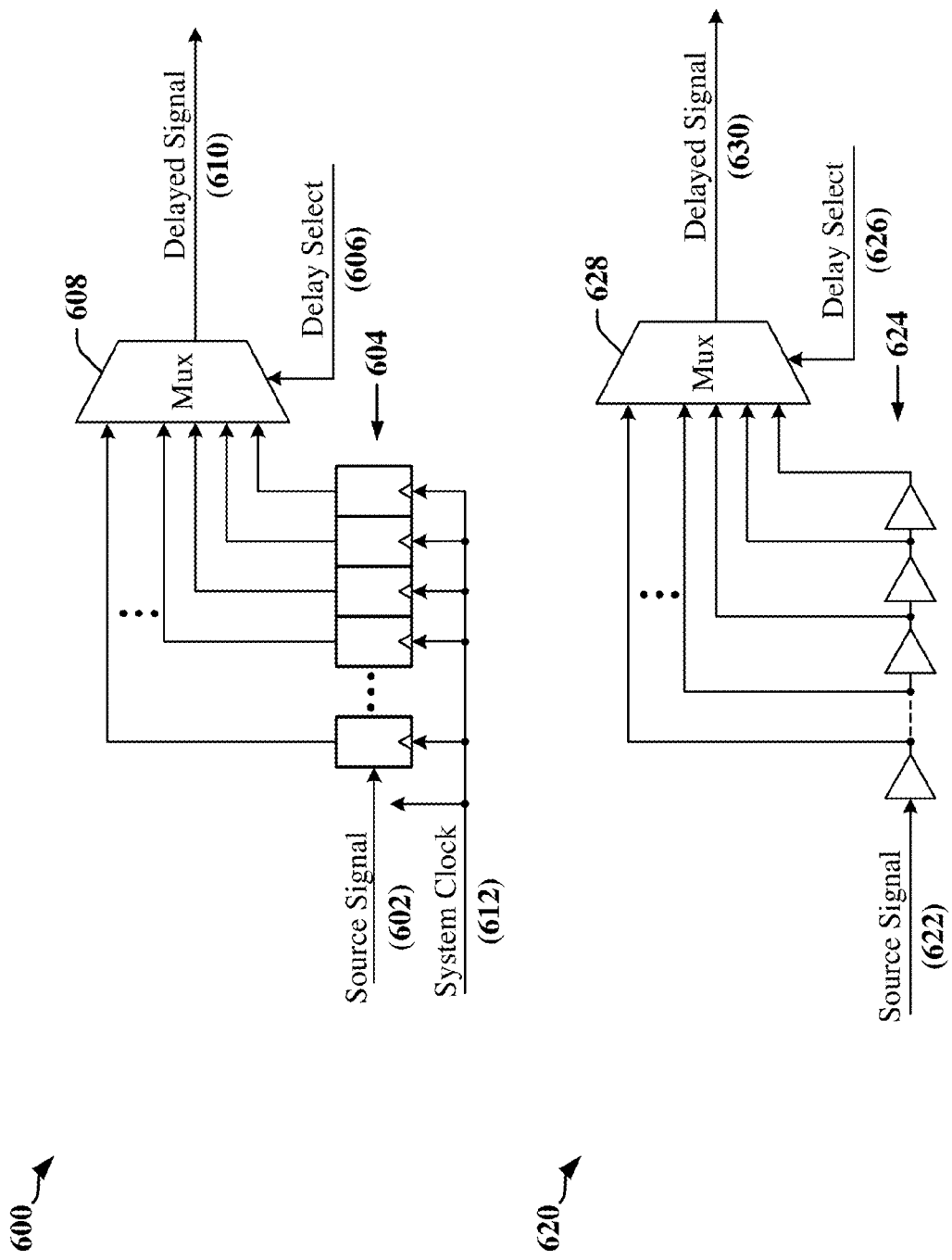
FIG. 6 illustrates examples of cell delays P and S that may be used with the CDR circuit of FIG. 5.

FIG. 6 illustrates example 600, 620s of cell delays P and S that may be used with the CDR circuit 500 of FIG. 5. In the first example 600, a link whose data rate is slow enough, an internal system clock 612 can be used to implement digital delay cells, Delay P and Delay S. In the example, a source signal 602 may be clocked through a series of registers 604 and a multiplexer 608 may be controlled by a delay select signal 606 to select an output of one of the series of registers 604 as the output delayed signal 610. In the example 620, a link whose data rate is fast, analog delays may be provided by buffers 624 or the like may be used to implement delay cells, Delay P and Delay S. In the example, a source signal 622 may be clocked through the buffers 624, and a multiplexer 628 may be controlled by a delay select signal 626 to select an output of one of the buffers 624 as the output delayed signal 630.

Figure 7:
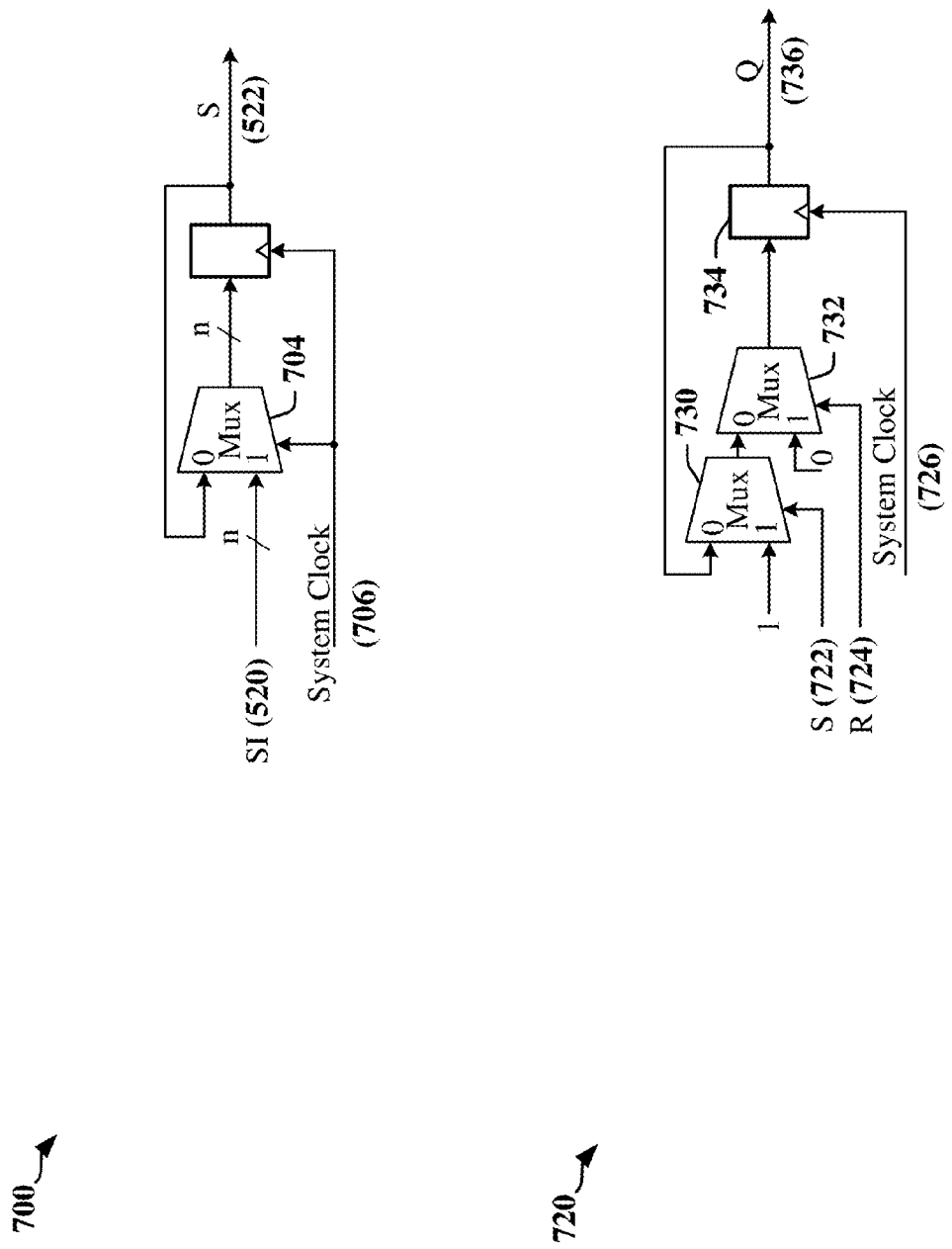
FIG. 7 illustrates examples of registers that may be used with the CDR circuit of FIG. 5.

FIG. 7 illustrates examples 700, 720 of registers 510 and 506 that may be used with the CDR circuit 500 of FIG. 5. In the first example 700, a link whose data rate is slow enough may use an internal system clock 706 to implement a register 510 that samples raw symbol input signals 520 and outputs the S signal 522. In the second example 720, the R-S register 506 may use an internal system clock 726 to generate glitch free (filtered) version of NE signals that are fully synchronous with the system clock 726. The R-S register 506 is implemented with priority for the R input 724 over the S input 722. For the link whose data rate is fast, asynchronous level latches may be used to sample raw symbol input signals and an asynchronous R-S latch for the filtered NE signal 514 generation may be used.

Low-Voltage Differential Signaling Communications Links

Figure 8:
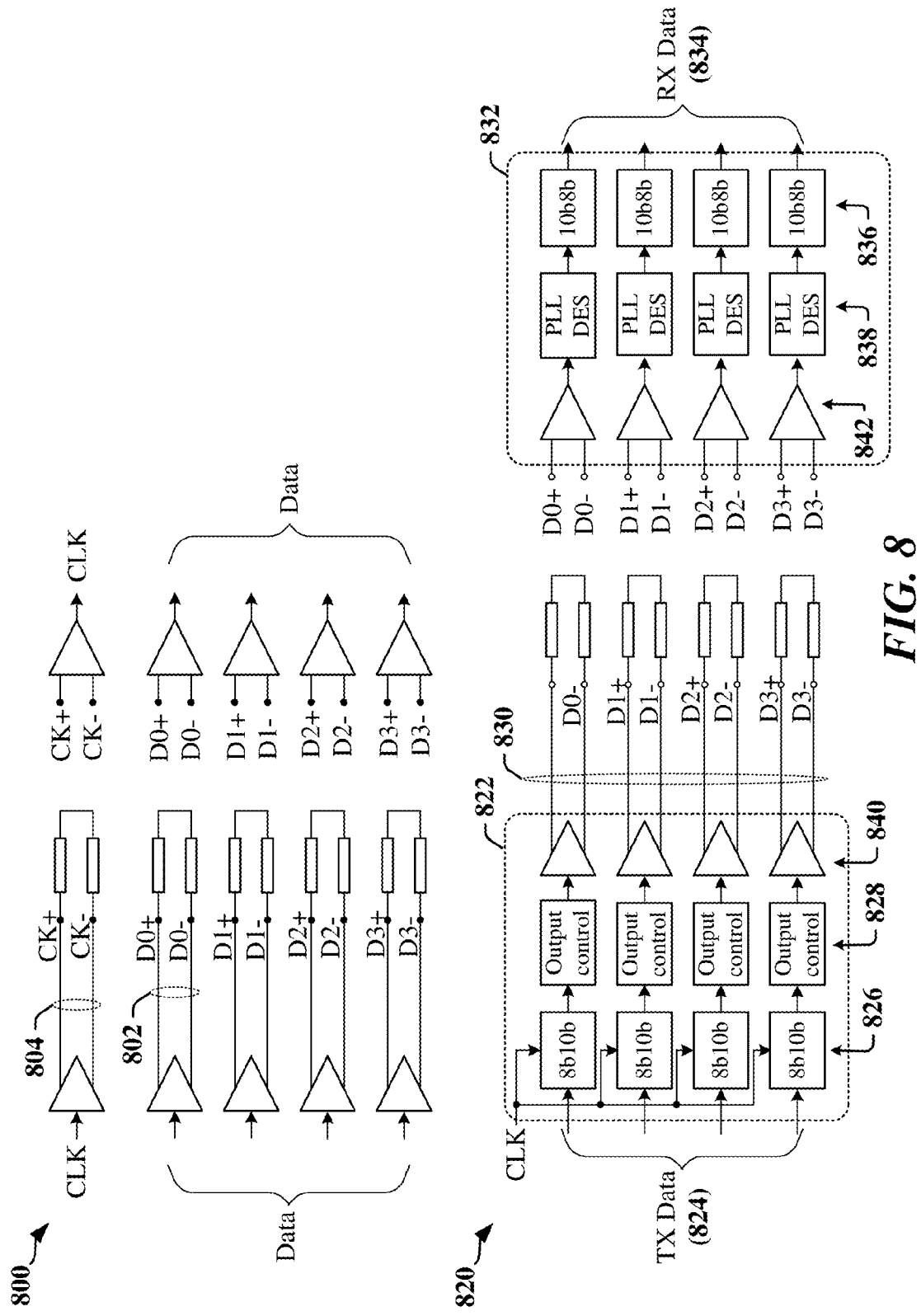
FIG. 8 illustrates examples of communications links that employ differential signaling.

Certain aspects described herein with respect to single-ended communications links may be adapted for use in communications links that are configured for differential signaling schemes. FIG. 8 includes a block drawing 800 illustrating a conventional low-voltage differential signaling (LVDS) communications link. Typically, the LVDS communications link has one or more pairs of wires (differential pairs) 802, 804, each pair of wires carrying a pair of complementary signals. For example, data may be encoded in a first pair of wires 802 and a transmission clock may be transmitted in a second pair of wires 804. LVDS can reduce or eliminate common-mode noise when the wires in each pair of wires 802 or 804 are in close proximity to the other wire in the pair of wires 802 or 804. In one example, a pair of wires 802, 804 may include a twisted pair of wires that interconnect two or more devices. In another example, a pair of wires 802, 804 may be provided in close proximity within a semiconductor integrated circuit (IC) device, on a substrate carrying one or more IC devices, and/or on a printed circuit board or the like. LVDS can improve resistance to electromagnetic interference, particularly common-mode interference that has significant power and/or amplitude in comparison to the power and/or amplitude of the signals transmitted on the signal wires of a communications link.

In some instances, clocking information may be embedded in transmitted data. FIG. 8 includes a block diagram 820 illustrating a transmitter 822 and receiver 832 configured to support an encoding scheme that transmits data on a differential communications link 830 that does not have a separate and/or dedicated clock lane. In the transmitter 822, encoders 826 encode 8-bit transmission data 824 in a line code such as the 8b10b code that may be used to map 8-bit symbols to 10-bit symbols. The 8b10b code may provide direct current balance (DC-balance) with sufficient signaling state transitions to permit clock recovery at the receiver 832. The outputs of the encoders 826 may be provided through output control logic 828 to differential line drivers 840 coupled to a differential communications link 830. In one example, the differential communications link 830 is an LVDS link.

The use of the 8b10b code may ensure sufficient signaling state transitions on each of the differential signals transmitted over the differential communications link 830 such that PLL and deserialization (DES) circuits 838 in the receiver 832 can synchronize a receive clock to the clock used by the transmitter 822 for transmitting on the differential communications link 830 based on transitions in the signals received by the differential receivers 842. The 8b10b code provides run-length control such that sane bit state is not permitted to continue too long in order to maintain the PLLs 838 in lock. In some instances, the 8b10b code may enforce a limit of up to five consecutive bits to be the same. The 10b8b decoders 836 may be adapted to produce received data 834 corresponding to the transmission data 824.

The PLL and DES circuits 838 must typically be capable of achieving a fast synchronization lock to ensure reliable decoding of data received from the communications link 830. A receiver 832 may be required to have multiple internal predefined reference clocks that permit a PLL to be designed with a short period lock. The predefined reference clocks may have different frequencies or phase with respect to one another. The predefined reference clocks may limit the number of possible valid clock rates for the communications link 830. Thus, the use of predefined reference clocks can increase PLL circuit complexity and can limit the flexibility of operation of the communications link 830.

LVDS Communications Links Adapted for Symbol Transition Based Clocking

Figure 9:
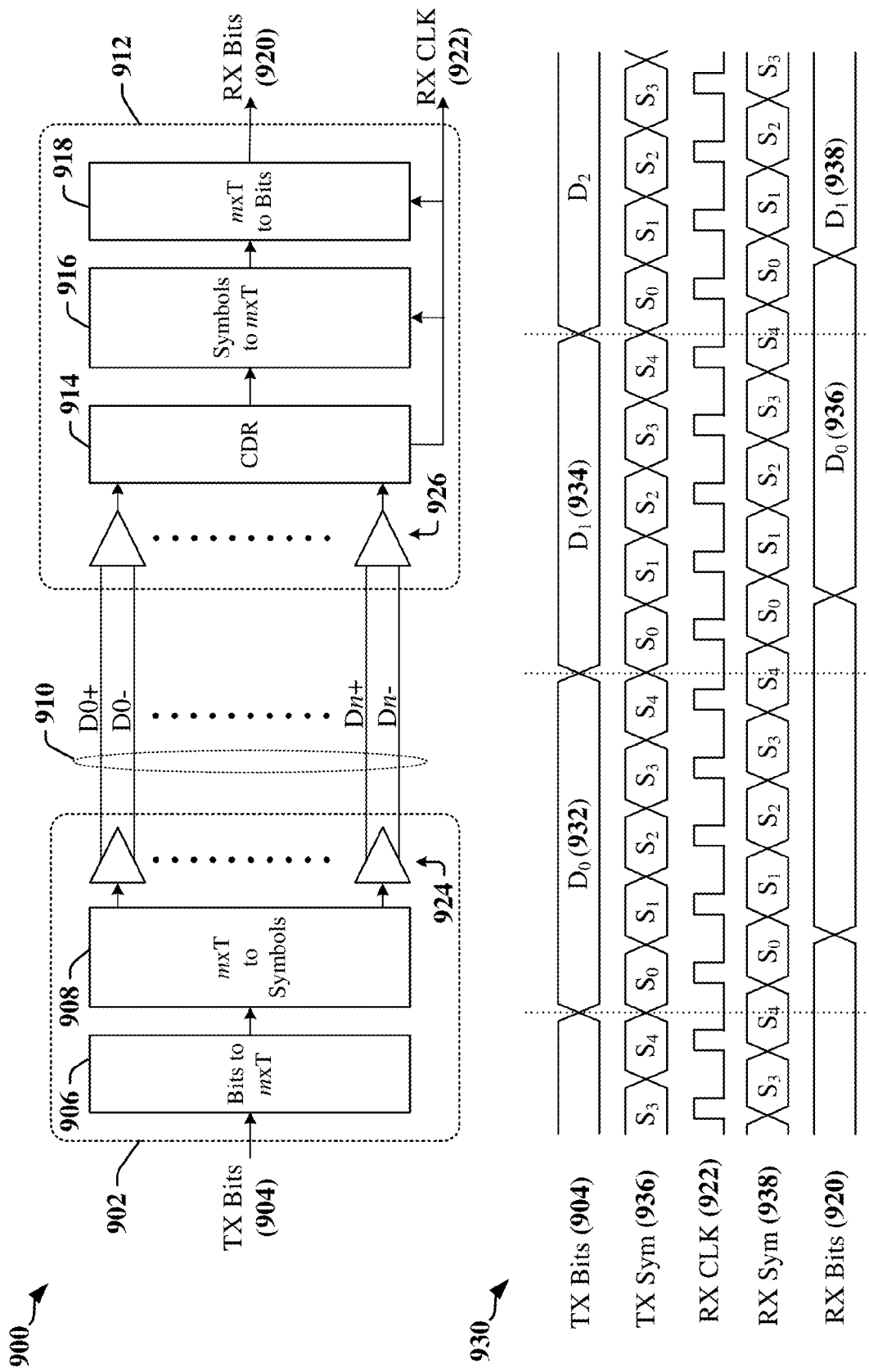
FIG. 9 is block diagram and timing chart illustrating the operation of a CDR circuit in a communications link configured according to certain aspects disclosed herein.

FIG. 9 includes a diagram 900 illustrating a combination of an encoder 902 and a decoder 912 that can support a variety of signaling schemes, including LVDS, without the use of a PLL associated with each transmitted signal. The transmitter 902 may include a converter 906 that converts a number of bits of binary formatted transmission data 904 into m multiple transition numbers (T0, T1, ..., Tm−1). A transition number to symbol converter 908 then converts transition numbers into n-bit symbols. In one example, the n-bit symbols may be transmitted by the LVDS drivers 924 or other differential drivers on n pairs of wires in the communications link 910.

The decoder 912 may be configurable to handle various signaling schemes, including single-ended, differential and other signaling schemes. In the example depicted, differential receivers 926 receive n pairs of differential signals from the n pairs of wires in the communications link 910. The differential receivers 926 provide an n-bit signal to a CDR 914, which extracts clock information and determines the symbol value from the n signals in each transmission cycle. A sequence of symbol values is provided to a converter 916 that converts the sequence of symbol values into m multiple transition numbers (T0, T1, ..., Tm−1). The m multiple transition numbers are provided to a decoder 918 that converts the m multiple transition numbers to bits of binary formatted data 920 representative of the transmission data 904.

Conversion Between Bits and Transition Numbers

Figure 10:
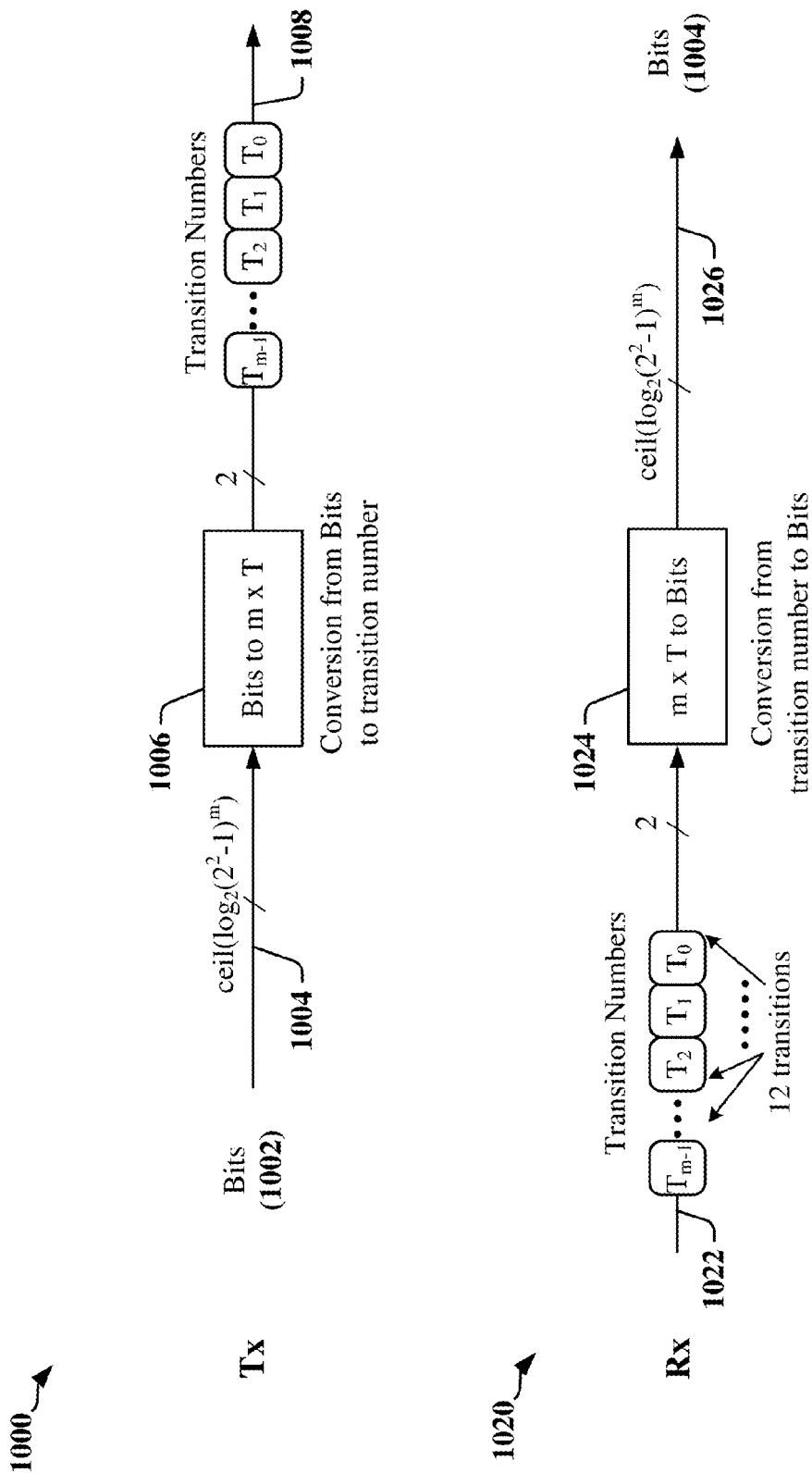
FIG. 10 illustrates the conversion from bits to transition numbers at a transmitter and then from transition numbers to bits at a receiver.

FIG. 10 illustrates an example of conversion from transmission data bits to transition numbers at a transmitter 1000 and from transition numbers to received data bits at a receiver 1020. A transition number may include one or more digits, where each digit is used to select a next symbol to be transmitted based on a symbol that is being currently transmitted. Symbols may be transmitted as differential signals over a desired or selected pairs of differential wires. The example of FIG. 10 illustrates transmission on a communication interface that has n=2 lanes, such as an interface that uses a 4-wire differential signaling system, or an interface that uses a 2-wire single-ended signaling system. The transmitter 1000 feeds binary information, Bits, into a "Bits-to-m×T" converter 1006 to generate m symbol transition numbers, $T_0$ to $T_{m-1}$. The receiver 1020 receives the m symbol transition numbers, $T_0$ to $T_{m-1}$, which are fed into an "m×T-to-Bits" converter 1024 in order to retrieve the binary information (i.e., the Bits) encoded therein. For example, when there are r possible symbol transition states per time interval T, designated as $T_0, T_1, \ldots T_{m-1}$, m transitions can provide $r^m$ different states. For an n differential pair (2n wire differential) communications link, $r=2^n-1$. Consequently, transitions $T_0, T_1, \ldots T_{m-1}$ contain data that can have $(2^n-1)^m$ different states.

In one example, it may be assumed the possible symbol transitions for each time interval T, r=10. Assuming that the number of symbols in a group m=3, such that the transition symbol is $T_2, T_1, T_0$, where $T_i$: 0, 1, 2, ..., 9. Each T can have 10 different states and the transition symbol for $T_2, T_1, T_0$ may be for example, a 3-digit number, such as $T_2=3, T_1=9, T_0=1$ (or the decimal number 391). In this manner a sequence of bits may be converted into a plurality of transition numbers and vice versa.

In an example, where the number of lanes n=2 (e.g. 4-wire differential signaling) and m=12, it may be assumed the possible symbol transition per one T, r=3 ($=2^2-1$). If the number of symbols in a group, m=12, a 12-digit ternary number (base-3 number): $T_{11}, T_{10}, \ldots, T_2, T_1, T_0$, where each $T_i$: 0, 1, 2. For example, for $\{T_{11}, T_{10}, \ldots T_2, T_1, T_0\} = \{2, 1, 0, 0, 1, 1, 0, 1, 0, 1, 2, 1\}$, the ternary number is:

$$2100\_1101\_0121_3 \text{(Ternary number)} =$$
$$2 \times 3^{11} + 1 \times 3^{10} + 0 \times 3^9 + 0 \times 3^8 + 1 \times 3^7 + 1 \times 3^6 + 0 \times 3^5 +$$
$$1 \times 3^4 + 0 \times 3^3 + 1 \times 3^2 + 2 \times 3^1 + 1 \times 3^0 = 416356(0x65A64).$$

In this manner, 12 transitions numbers may be converted into a number. Note that the transition number $2100\_1101\_0121_3$ may be used as the transition number, such that each integer may be mapped to a sequential symbol and vice versa.

Conversion Between Sequential Symbols and Transition Numbers

Figure 11:
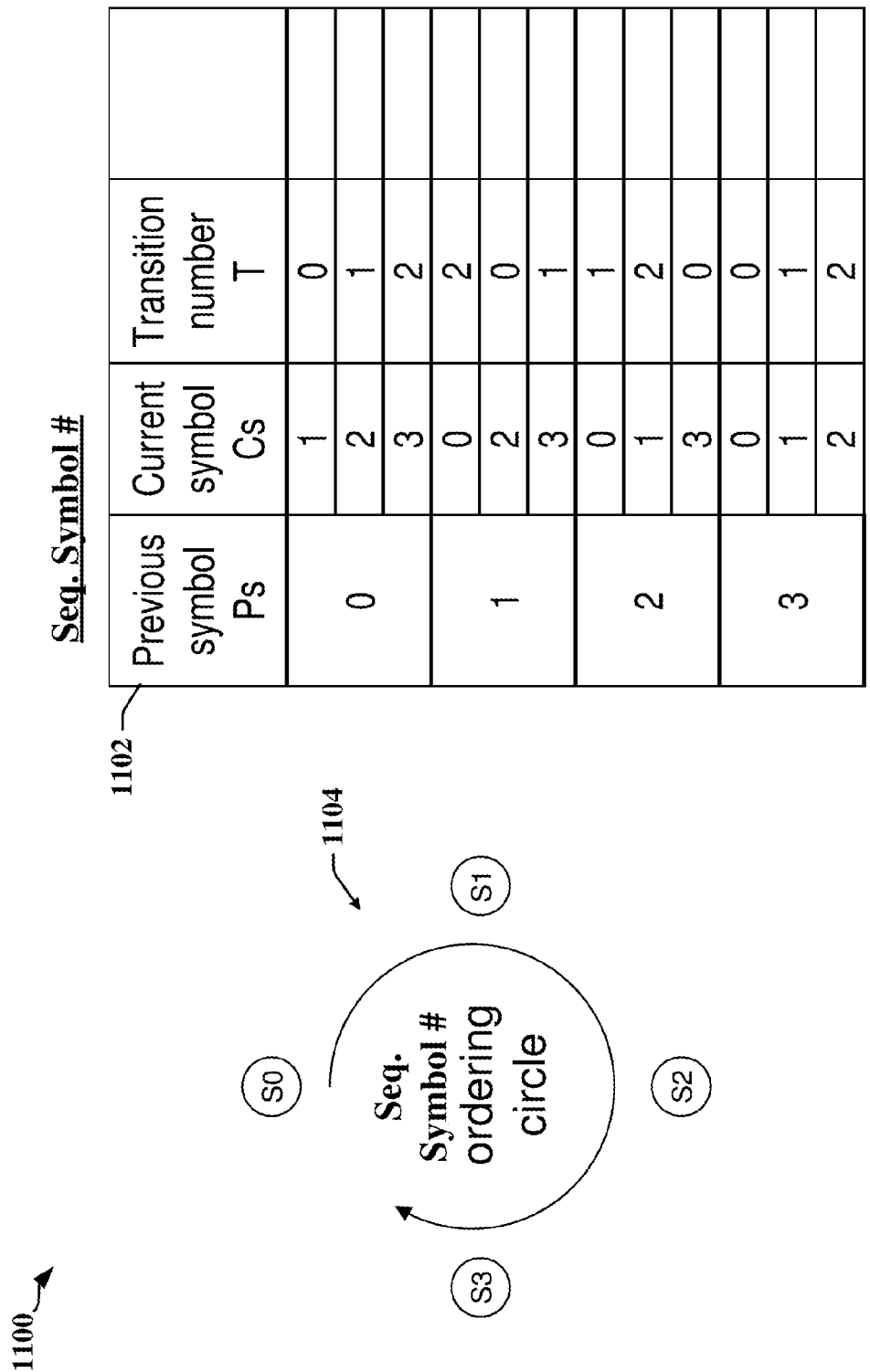
FIG. 11 illustrates one example of conversion between sequential symbols and transition numbers.

FIG. 11 illustrates one example 1100 of conversion between sequential symbols and transition numbers. This conversion maps each transition from a previous sequential symbol number (Ps) to a current sequential symbol number (Cs) to a transition number (T). At the transmitter device, the transition symbol numbers are converted to sequential symbol numbers. A relative conversion scheme may be selected to produce transition numbers which guarantee that no two consecutive sequential symbols numbers 1104 are the same.

The transition diagram 1104 illustrates an example of a 2-lane communication interface, using a 4-wire differential signaling system or a 2-wire single-ended signaling system. In this example, 4 raw symbols may be assigned to 4 sequential symbol numbers S0, S1, S2, and S3. Table 1102 illustrates an example of assignment of a transition number (T) based on a previous sequential symbol number (Ps) and the current sequential symbol number (Cs), in accordance with the transition diagram 1104. In this example, the transition number T may be assigned according to:

$T=Ps+1 \leq Cs$ $?Cs-(Ps+1)$ $:Cs-(Ps+1)+4.$

Conversely, the current sequential symbol number (Cs) may be assigned according to:

$Cs=Ps+1+T<4$ $?Ps+1+T$ $:Ps+1+T-4.$

A similar approach may be used for an n-lane communication interface by constructing a mapping of sequential symbol number to transition number table for any n (e.g., n=4, 5, 6, ...) that guarantees that the raw symbols will change at every transition. As noted elsewhere herein, the n-lane communication interface may be implemented using an n-wire single-ended signaling system or a 2n-wire differential signaling system.

For example, in the case of an n-lane communication interface, the transition number T may be assigned according to:

$T=Ps+1 \leq Cs$ $?Cs-(Ps+1)$ $:Cs-(Ps+1)+2^n$.

Conversely, in the case of an n-lane communication interface, the current sequential symbol number (Cs) may be assigned according to:

$Cs=Ps+1+T<2^n$ $?Ps+1+T$ $:Ps+1+T-2^n$.

Utilization Examples

Depending on the number of lanes and corresponding number of wires/conductors used and the symbols/group selected, different utilization percentages may be achieved. "Utilization" may refer to the efficiency with which a number of bits per group may be sent. In these example, "utilization" may be represented as a percentage between an integer number of bits per group that are transmitted and a theoretical number of bits per group that may be transmitted for a given number of lanes and/or conductors and symbols per group.

Figure 12:
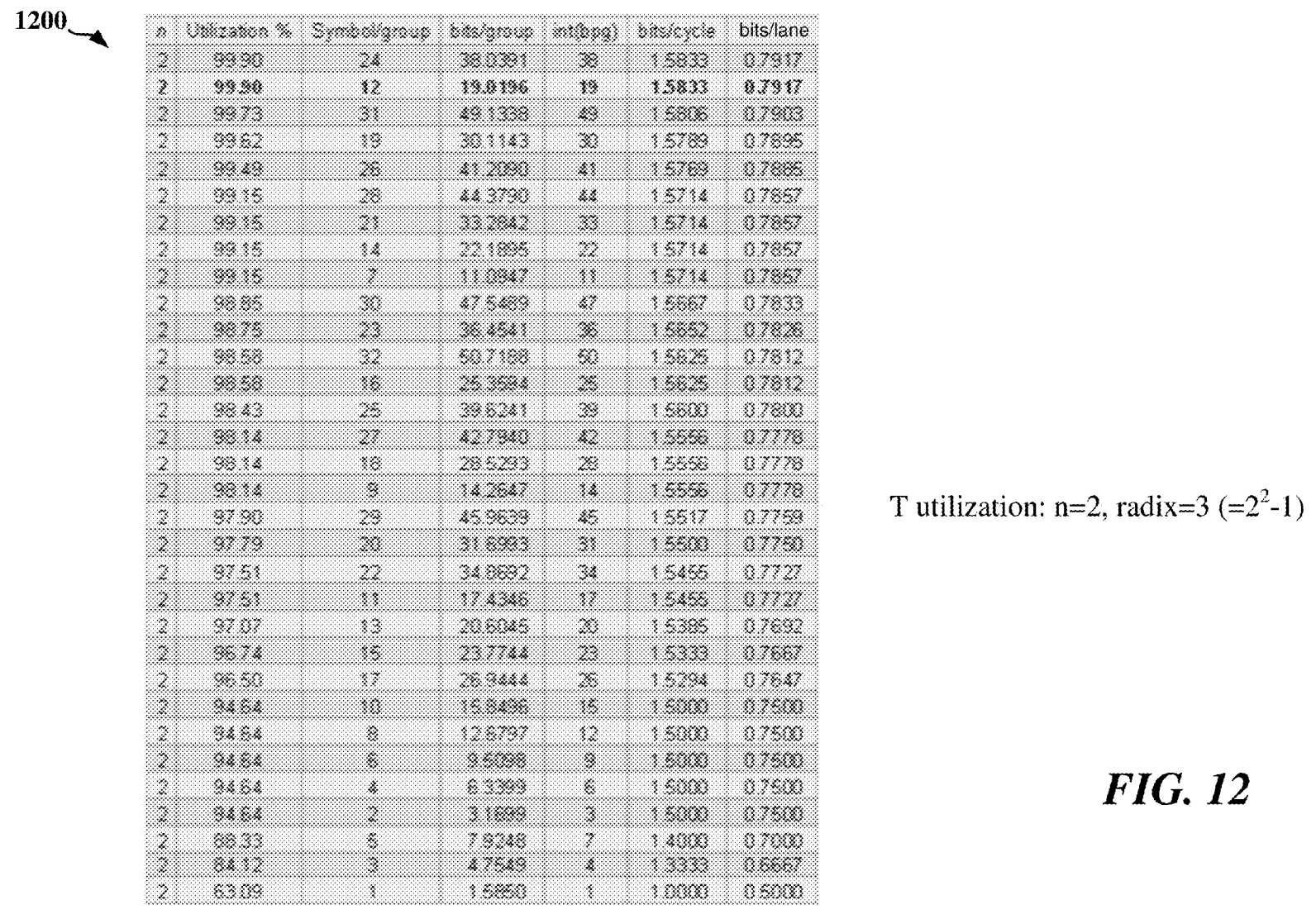

FIG. 12 illustrates a utilization table for a 2-lane communication interface using all 3 available states per symbol for various symbols per group. In this example, 1.5833 bits/cycle can be sent by 12 symbols/group, while a 1 symbol/group can only send 1 bit/cycle.

Figure 13:
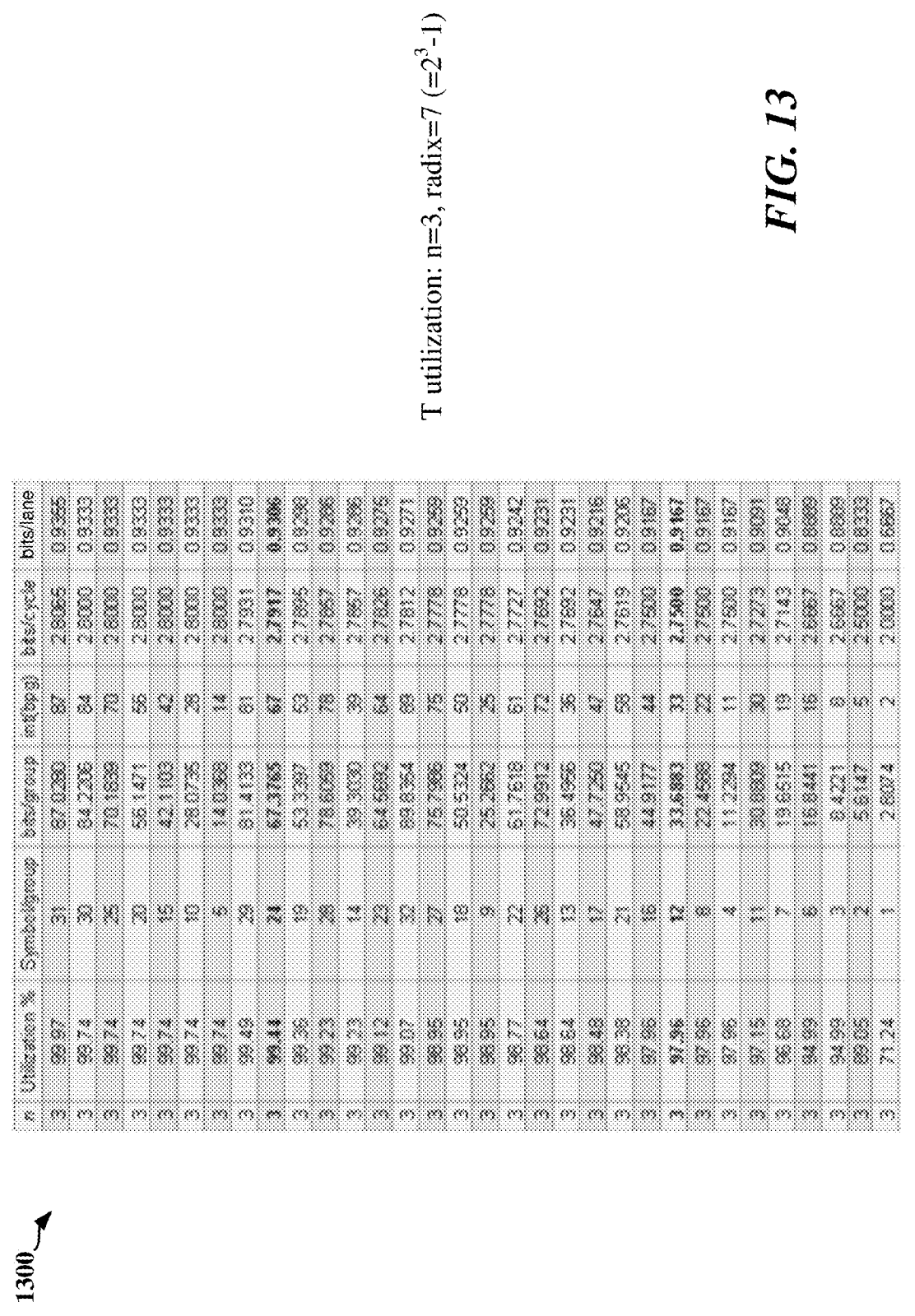

FIG. 13 illustrates a utilization table for a 3-lane communication interface using all 7 available states per symbol for various symbols per group. In this example, 2.7917 bits/cycle can be sent by 24 symbols/group, while a 1 symbol/group can only send 2 bits/cycle. Note that this results in 67 bits of information being sent (or 99.44% utilization). For example, the 67 bits can be used for 64 data bits and 3 control bits.

FIG. 14 illustrates a utilization table for a 3-lane communication interface using 6 available states per symbol (after reserving 1 state for a special purpose) for various symbols per group. In this example, 2.5769 bits/cycle can be sent by 26 symbols/group, while 1 symbol/group can only send 2 bits/cycle. Note that this results in 67 bits of information being sent (or 99.69% utilization).

Some communication interfaces may not use some states among all the available symbol states. For example for n=3 the state "111" may be reserved for other purposes. In the table in FIG. 14, 1 state has been dumped/reserved from a total of 8 symbol states. The available transition number is then $6=2^3-2$ (i.e., transitions to all states other than self and the reserved/dumped state).

FIG. 15 illustrates a utilization table for a 4-lane communication interface using all 15 available states per symbol for various symbols per group. In this example, 3.9 bits/cycle can be sent by 10 symbols/group, while 1 symbol/group can only send 3 bits/cycle. Note that this results in 39 bits of information being sent (or 99.82% utilization).

FIG. 16 illustrates a utilization table for a 4-lane communication interface using 14 available states per symbol (after reserving 1 state for a special purpose) at various symbols per group. In this example, 3.8 bits/cycle can be sent by 10 symbols/group, while 1 symbol/group can only send 3 bits/cycle. Note that this results in 38 bits of information being sent (or 99.81% utilization).

Some communication interfaces may not use some states among all the available symbol states. For example for n=4 the state "1111" may be reserved for other purposes. In the table in FIG. 16, 1 state has been dumped from a total of 16 symbol states. The available transition number is then $14=2^4-2$ (i.e., transitions to all states other than self and the reserved/dumped state).

FIG. 17 illustrates a utilization table for a 5-wire system using all 31 available states per symbol for various symbols per group.

FIG. 18 illustrates a utilization table for a 5-lane communication interface using 30 available states per symbol (after reserving 1 state for a special purpose) at various symbols per group.

FIG. 19 illustrates a utilization table for an 8-lane communication interface using all 255 available states per symbol for various symbols per group.

FIG. 20 illustrates a utilization table for an 8-lane communication interface using 254-available states per symbol (after reserving 1 state for a special purpose) at various symbols per group.

Figure 21:
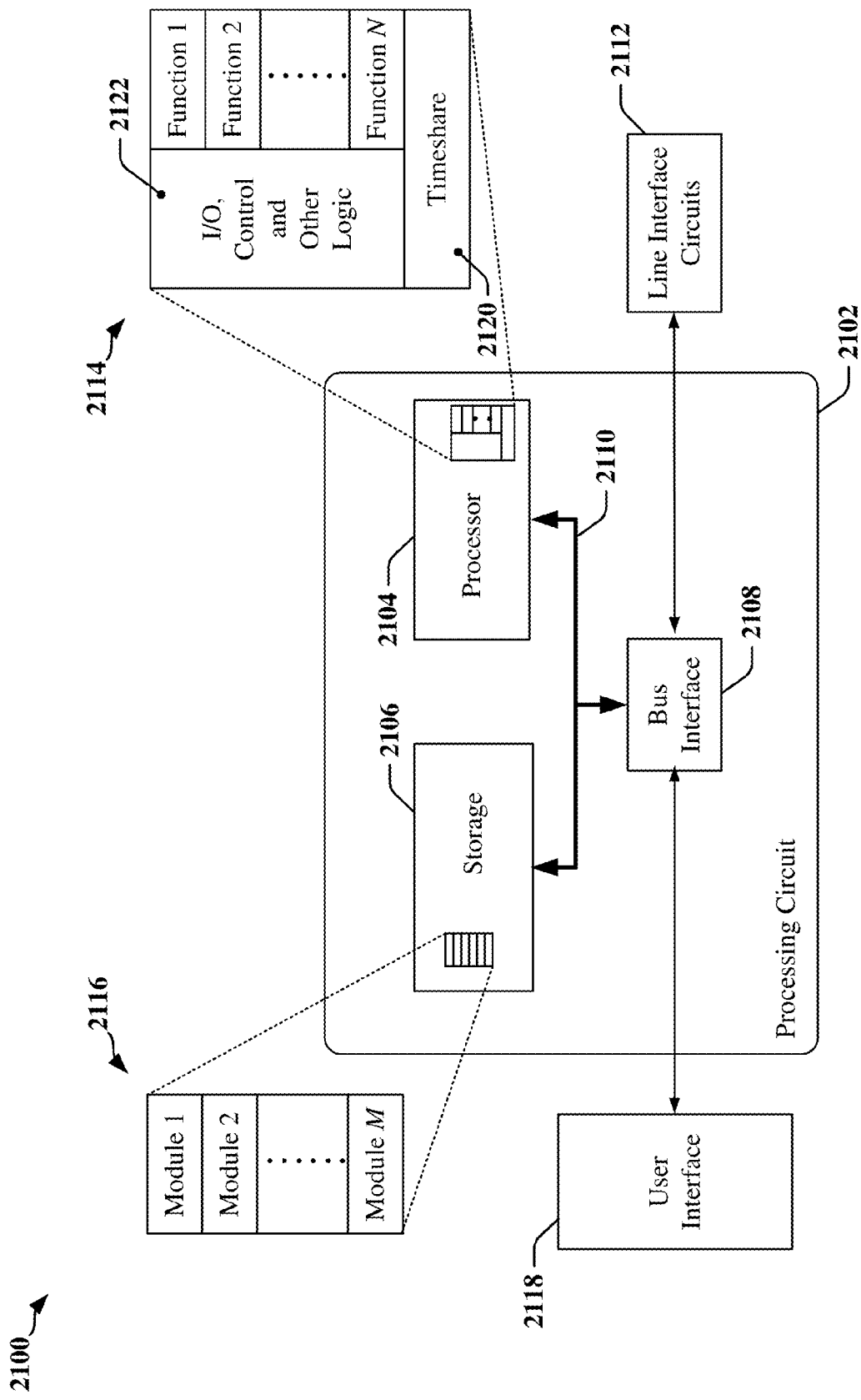
FIG. 21 is a block diagram illustrating an example of an apparatus employing a processing circuit that may be adapted according to certain aspects disclosed herein.

FIG. 21 is a conceptual diagram 2100 illustrating a simplified example of a hardware implementation for an apparatus employing a processing circuit 2102 that may be configured to perform one or more functions disclosed herein. In accordance with various aspects of the disclosure, an element, or any portion of an element, or any combination of elements as disclosed herein may be implemented using the processing circuit 2102. The processing circuit 2102 may include one or more processors 2104 that are controlled by some combination of hardware and software modules. Examples of processors 2104 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 2104 may include specialized processors that perform specific functions, and that may be configured, augmented or controlled by one of the software modules 2116. The one or more processors 2104 may be configured through a combination of software modules 2116 loaded during initialization, and further configured by loading or unloading one or more software modules 2116 during operation.

In the illustrated example, the processing circuit 2102 may be implemented with a bus architecture, represented generally by the bus 2110. The bus 2110 may include any number of interconnecting buses and bridges depending on the specific application of the processing circuit 2102 and the overall design constraints. The bus 2110 links together various circuits including the one or more processors 2104, and storage 2106. Storage 2106 may include memory devices and mass storage devices, and may be referred to herein as computer-readable media and/or processor-readable media. The bus 2110 may also link various other circuits such as timing sources, timers, peripherals, voltage regulators, and power management circuits. A bus interface 2108 may provide an interface between the bus 2110 and one or more transceivers 2112. A transceiver 2112 may be provided for each networking technology supported by the processing circuit. In some instances, multiple networking technologies may share some or all of the circuitry or processing modules found in a transceiver 2112. Each transceiver 2112 provides a means for communicating with various other apparatus over a transmission medium. Depending upon the nature of the apparatus, a user interface 2118 (e.g., keypad, display, speaker, microphone, joystick) may also be provided, and may be communicatively coupled to the bus 2110 directly or through the bus interface 2108.

A processor 2104 may be responsible for managing the bus 2110 and for general processing that may include the execution of software stored in a computer-readable medium that may include the storage 2106. In this respect, the processing circuit 2102, including the processor 2104, may be used to implement any of the methods, functions and techniques disclosed herein. The storage 2106 may be used for storing data that is manipulated by the processor 2104 when executing software, and the software may be configured to implement any one of the methods disclosed herein.

One or more processors 2104 in the processing circuit 2102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2106 or in an external computer readable medium. The external computer-readable medium and/or storage 2106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 2106 may also include, by way of example, a carrier wave, a transmission line, and any other suitable medium for transmitting software and/or instructions that may be accessed and read by a computer. Computer-readable medium and/or the storage 2106 may reside in the processing circuit 2102, in the processor 2104, external to the processing circuit 2102, or be distributed across multiple entities including the processing circuit 2102. The computer-readable medium and/or storage 2106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2106 may maintain software maintained and/or organized in loadable code segments, modules, applications, programs, etc., which may be referred to herein as software modules 2116. Each of the software modules 2116 may include instructions and data that, when installed or loaded on the processing circuit 2102 and executed by the one or more processors 2104, contribute to a run-time image 2114 that controls the operation of the one or more processors 2104. When executed, certain instructions may cause the processing circuit 2102 to perform functions in accordance with certain methods, algorithms and processes described herein.

Some of the software modules 2116 may be loaded during initialization of the processing circuit 2102, and these software modules 2116 may configure the processing circuit 2102 to enable performance of the various functions disclosed herein. For example, some software modules 2116 may configure internal devices and/or logic circuits 2122 of the processor 2104, and may manage access to external devices such as the transceiver 2112, the bus interface 2108, the user interface 2118, timers, mathematical coprocessors, and so on. The software modules 2116 may include a control program and/or an operating system that interacts with interrupt handlers and device drivers, and that controls access to various resources provided by the processing circuit 2102. The resources may include memory, processing time, access to the transceiver 2112, the user interface 2118, and so on.

One or more processors 2104 of the processing circuit 2102 may be multifunctional, whereby some of the software modules 2116 are loaded and configured to perform different functions or different instances of the same function. The one or more processors 2104 may additionally be adapted to manage background tasks initiated in response to inputs from the user interface 2118, the transceiver 2112, and device drivers, for example. To support the performance of multiple functions, the one or more processors 2104 may be configured to provide a multitasking environment, whereby each of a plurality of functions is implemented as a set of tasks serviced by the one or more processors 2104 as needed or desired. In one example, the multitasking environment may be implemented using a timesharing program 2120 that passes control of a processor 2104 between different tasks, whereby each task returns control of the one or more processors 2104 to the timesharing program 2120 upon completion of any outstanding operations and/or in response to an input such as an interrupt. When a task has control of the one or more processors 2104, the processing circuit is effectively specialized for the purposes addressed by the function associated with the controlling task. The timesharing program 2120 may include an operating system, a main loop that transfers control on a round-robin basis, a function that allocates control of the one or more processors 2104 in accordance with a prioritization of the functions, and/or an interrupt driven main loop that responds to external events by providing control of the one or more processors 2104 to a handling function.

Figure 22:
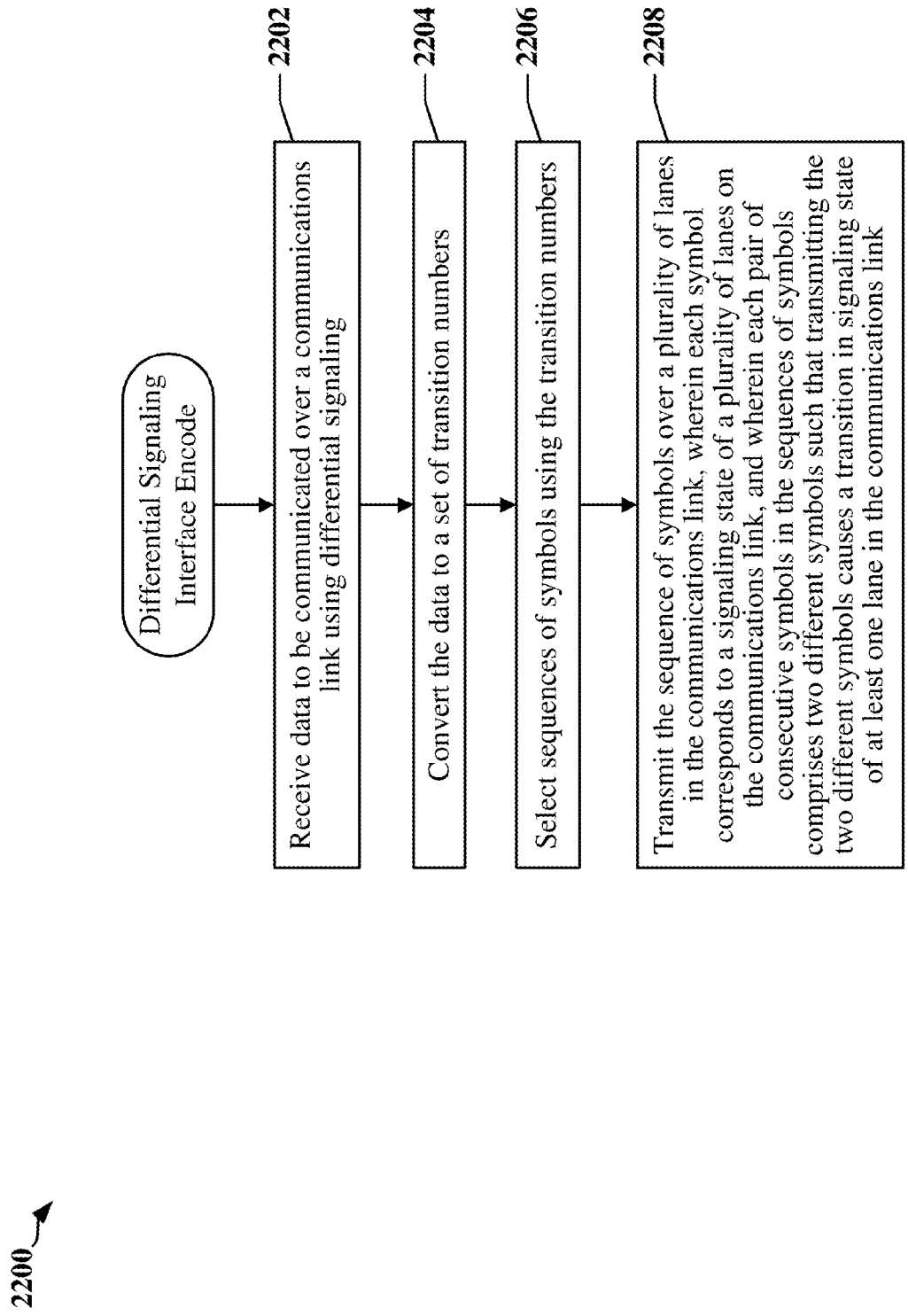
FIG. 22 is a flow chart of a method of encoding for low-voltage differential signaling.

FIG. 22 is a flowchart illustrating a method for data communications that may be performed by a transmitter on a multi-wire differential communications link. The communications link may include a plurality of connectors that carry symbols encoded using a suitable encoding scheme. The connectors may include electrically conductive wires, optical signal conductors, semi-conductive interconnects and so on. The method may be performed by one or more processors of an encoder and/or device that interacts with, or houses the encoder.

At block 2202, data may be received for communication over a communications link using differential signaling. In one example, the communications link may be an LVDS communications link.

At block 2204, the data may be converted to a set of transition numbers.

At block 2206, sequences of symbols may be selected using the transition numbers.

At block 2202, the sequence of symbols may be transmitted over a plurality of lanes in the communications link. Each symbol may correspond to a signaling state of a plurality of lanes on the communications link. Each pair of consecutive symbols in the sequences of symbols may include two different symbols such that transmitting the two different symbols causes a transition in signaling state of at least one lane in the communications link. The sequence of symbols may be transmitted as a plurality of signals. Each signal may be transmitted over one of the plurality of lanes.

In one example, clock information is embedded in transitions in signaling state of the plurality of lanes occurring between symbols consecutively transmitted on the communications link.

In one example, each lane may be implemented using a pair of differential signal wires. Transmitting the sequence of symbols may include providing a differential signal to each lane. The differential signal may correspond to a bit position in each symbol of the sequence of symbols. Transmitting the sequence of symbols may include using low voltage differential drivers to transmit the sequence of symbols.

The sequence of symbols may be transmitted without a transmit clock signal. A clock lane of the communications link may be repurposed to carry a differential signal corresponding to one bit of symbols transmitted on the communications link. In one example, switching logic may be employed to repurpose the lane, such that a differential transmitter may receive a signal corresponding to a stream of symbols rather than a signal corresponding to a transmit clock.

Figure 23:
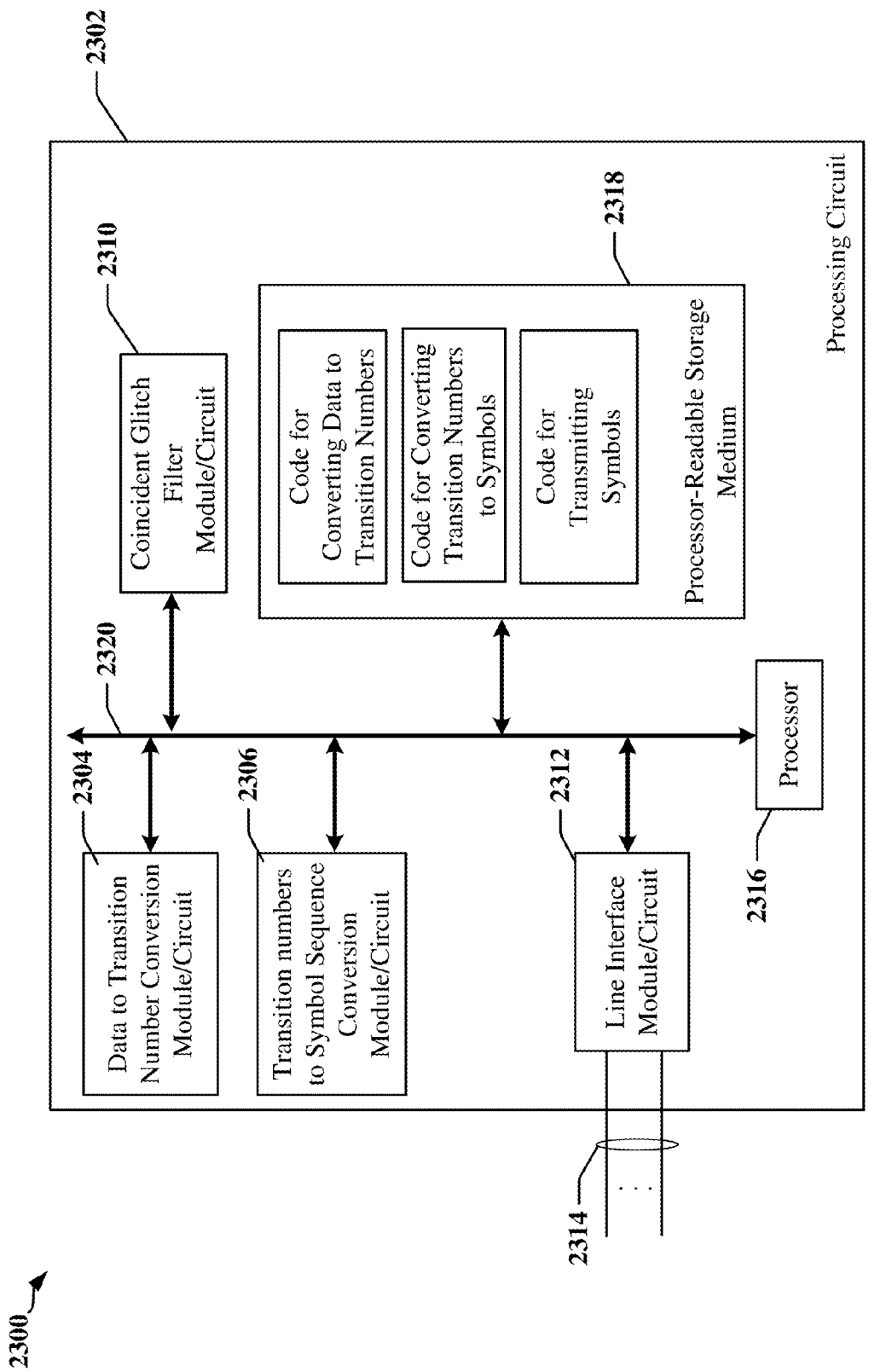
FIG. 23 is a diagram illustrating an example of a hardware implementation for an encoding apparatus employing low-voltage differential signaling.

FIG. 23 is a diagram 2300 illustrating a simplified example of a hardware implementation for an apparatus employing a processing circuit 2302. The processing circuit typically has a processor 2316 that may include one or more of a microprocessor, microcontroller, digital signal processor, a sequencer and a state machine. The processing circuit 2302 may be implemented with a bus architecture, represented generally by the bus 2320. The bus 2320 may include any number of interconnecting buses and bridges depending on the specific application of the processing circuit 2302 and the overall design constraints. The bus 2320 links together various circuits including one or more processors and/or hardware modules, represented by the processor 2316, the modules or circuits 2304, 2306 and 2308, line interface circuits 2312 configurable to communicate over connectors or wires 2314 and the computer-readable storage medium 2318. The bus 2320 may also link various other circuits such as timing sources, peripherals, voltage regulators, and power management circuits, which are well known in the art, and therefore, will not be described any further.

The processor 2316 is responsible for general processing, including the execution of software stored on the computer-readable storage medium 2316. The software, when executed by the processor 2316, causes the processing circuit 2302 to perform the various functions described supra for any particular apparatus. The computer-readable storage medium 2318 may also be used for storing data that is manipulated by the processor 2316 when executing software, including data decoded from symbols transmitted over the connectors 2314, which may be configured as data lanes and clock lanes. The processing circuit 2302 further includes at least one of the modules 2304, 2306 and 2308. The modules 2304, 2306 and 2308 may be software modules running in the processor 2316, resident/stored in the computer readable storage medium 2318, one or more hardware modules coupled to the processor 2316, or some combination thereof. The modules 2304, 2306 and/or 2308 may include microcontroller instructions, state machine configuration parameters, or some combination thereof.

In one configuration, an apparatus 2300 for wireless communication includes a module and/or circuit 2304 that is configured to convert data bits into a plurality of transition numbers, and a module and/or circuit 2306 configured to convert the plurality of transition numbers into a sequence of symbols.

Figure 24:
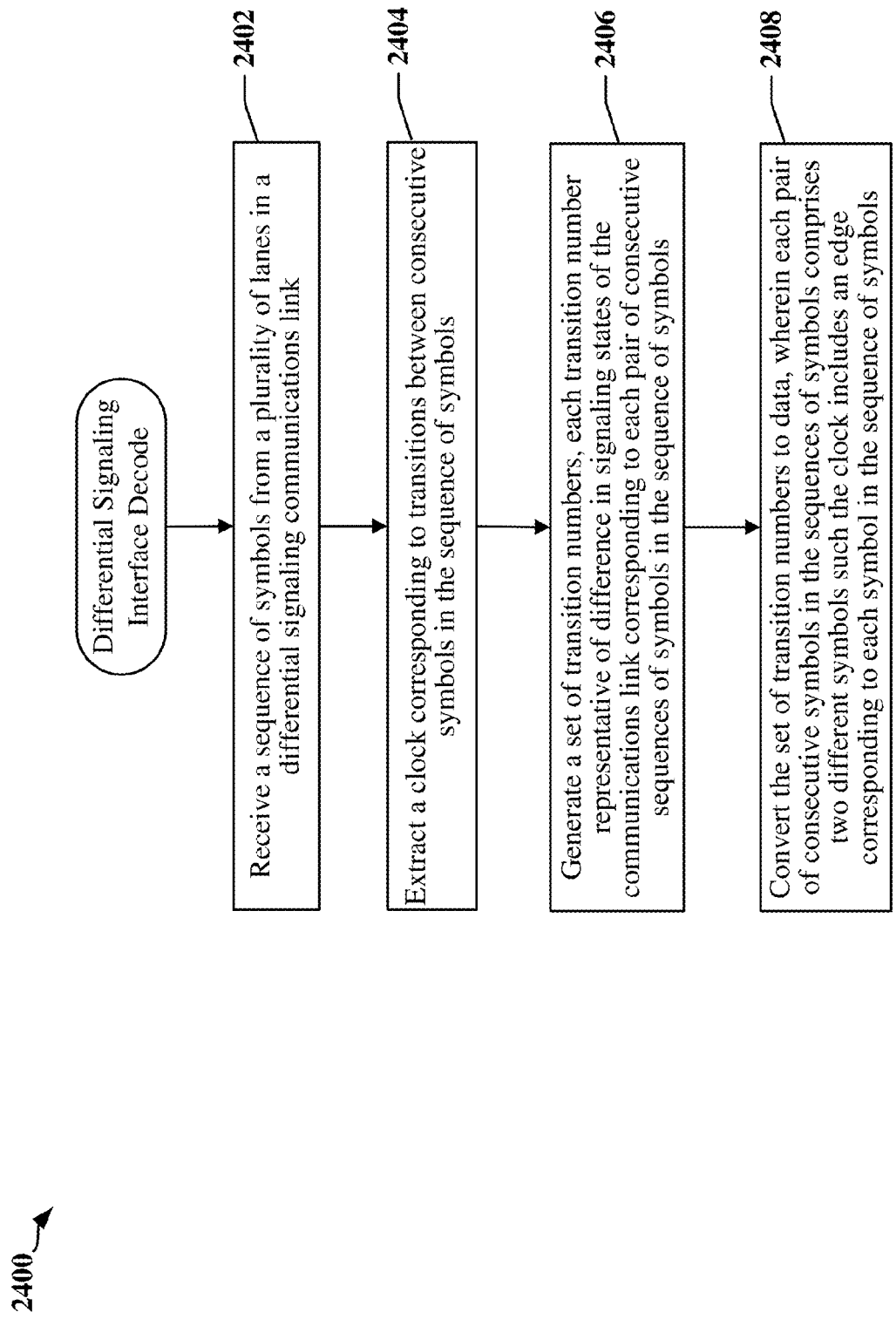
FIG. 24 is a flow chart of a method of decoding for low-voltage differential signaling.

FIG. 24 is a flowchart illustrating a method for data communications on a multi-wire communications link. The communications link may include a plurality of connectors that carry symbols encoded using a suitable encoding scheme. The connectors may include electrically conductive wires, optical signal conductors, semi-conductive interconnects and so on. The method may be performed by one or more processors of a decoder and/or device that interacts with, or houses the decoder.

At block 2402 a sequence of symbols may be received from a plurality of lanes in a communications link. The sequence of symbols may be encoded in a plurality of differential signals. Each differential signal may be received from a different lane of the communications link. The communications link may employ low voltage differential signaling.

At block 2404, a receive clock corresponding to transitions between consecutive symbols in the sequence of symbols may be extracted. Edges of the receive clock may correspond to transitions between symbols in the sequence of symbols.

At block 2406, a set of transition numbers may be generated. Each transition number may be representative of difference in signaling states of the communications link corresponding to each pair of consecutive sequences of symbols in the sequence of symbols.

At block 2408, the set of transition numbers may be converted to data. Each pair of consecutive symbols in the sequences of symbols may include two different symbols such the clock includes an edge corresponding to each symbol in the sequence of symbols.

In one example, the sequence of symbols may be captured using the receive clock. The first convertor may be controlled using the receive clock. The second convertor may be controlled using the receive clock.

Figure 25:
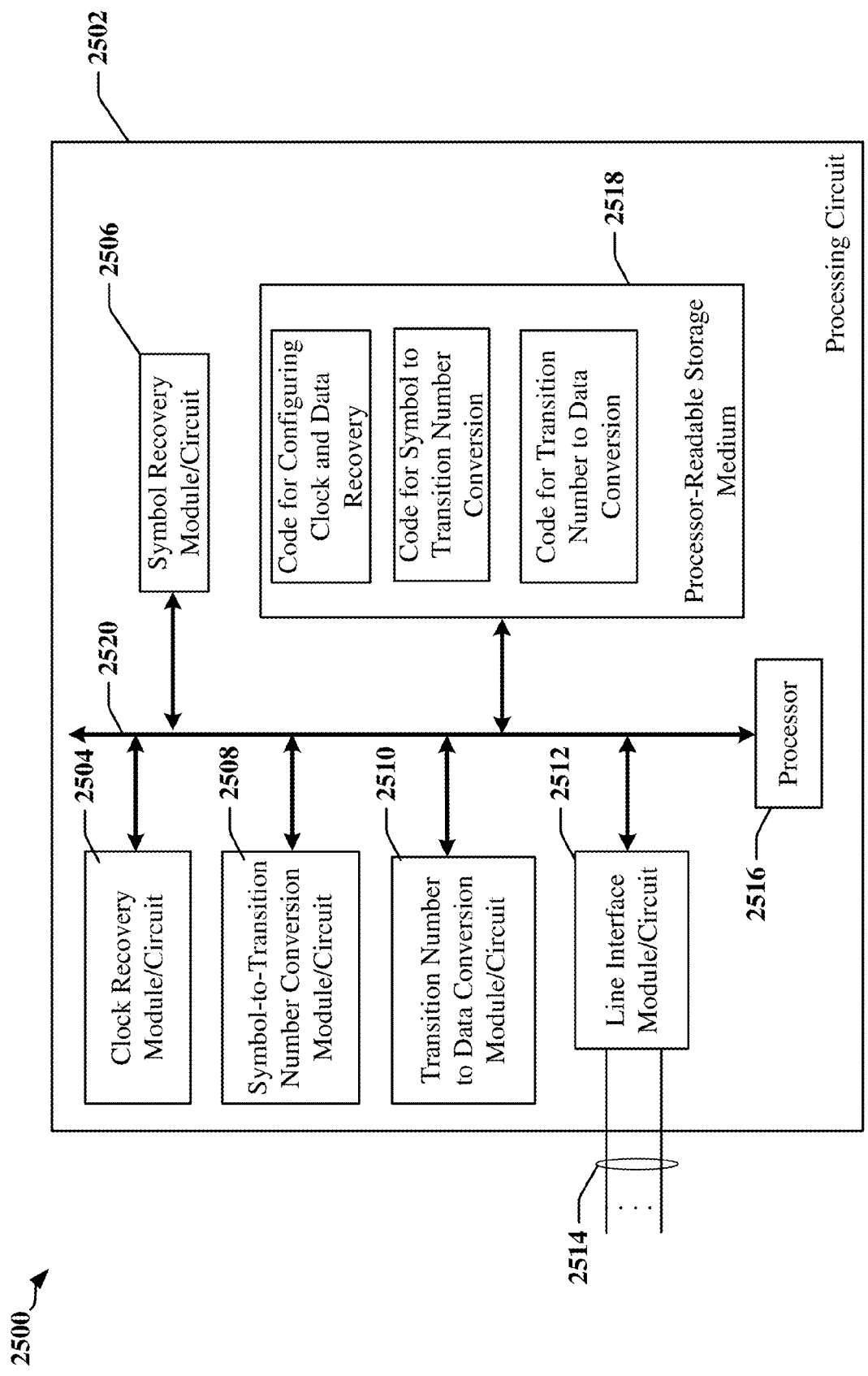
FIG. 25 is a diagram illustrating an example of a hardware implementation for a decoding apparatus for use with low-voltage differential signaling.

FIG. 25 is a diagram 2500 illustrating a simplified example of a hardware implementation for an apparatus employing a processing circuit 2502. The processing circuit typically has a processor 2516 that may include one or more of a microprocessor, microcontroller, digital signal processor, a sequencer and a state machine. The processing circuit 2502 may be implemented with a bus architecture, represented generally by the bus 2520. The bus 2520 may include any number of interconnecting buses and bridges depending on the specific application of the processing circuit 2502 and the overall design constraints. The bus 2520 links together various circuits including one or more processors and/or hardware modules, represented by the processor 2516, the modules or circuits 2504, 2506 and 2508, line interface circuits 2512 configurable to communicate over connectors or wires 2514 and the computer-readable storage medium 2518. The bus 2520 may also link various other circuits such as timing sources, peripherals, voltage regulators, and power management circuits, which are well known in the art, and therefore, will not be described any further.

The processor 2516 is responsible for general processing, including the execution of software stored on the computer-readable storage medium 2516. The software, when executed by the processor 2516, causes the processing circuit 2502 to perform the various functions described supra for any particular apparatus. The computer-readable storage medium 2518 may also be used for storing data that is manipulated by the processor 2516 when executing software, including data decoded from symbols transmitted over the connectors 2514, which may be configured as data lanes and clock lanes. The processing circuit 2502 further includes at least one of the modules 2504, 2506 and 2508. The modules 2504, 2506 and 2508 may be software modules running in the processor 2516, resident/stored in the computer readable storage medium 2518, one or more hardware modules coupled to the processor 2516, or some combination thereof. The modules 2504, 2506 and/or 2508 may include microcontroller instructions, state machine configuration parameters, or some combination thereof.

In one configuration, the apparatus 2500 for wireless communication includes an interface circuit 2512 that may include a plurality of low voltage differential receivers. The apparatus 2500 may include a module and/or circuit 2504 that is configured to recover a clock from transitions detected between symbols transmitted on a communications link 2514, a module and/or circuit 2506 configured to manage or perform symbol-to-transition number conversion, a module and/or circuit 2510 configured to convert transition numbers into data bits.

One or more of the components, steps, features and/or functions illustrated in the Figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for multi-wire signaling, comprising:
receiving data to be communicated over a communications link using differential signaling;
converting the data to a transition number, wherein the transition number includes one or more digits;
converting the transition number to a sequence of symbols, wherein each symbol in the sequence of symbols is selected based on a value of a digit of a corresponding transition number and an immediately preceding symbol; and
transmitting the sequence of symbols over a plurality of lanes in the communications link,
wherein each symbol corresponds to a signaling state of the plurality of lanes in the communications link, and
wherein each pair of consecutive symbols in the sequences of symbols comprises two different symbols such that transmitting the two different symbols causes a transition in signaling state of at least one lane in the communications link.

2. The method of claim 1, wherein clock information is embedded in transitions in signaling state of the plurality of lanes occurring between symbols consecutively transmitted on the communications link.

3. The method of claim 1, wherein the sequence of symbols is transmitted as a plurality of signals, each signal being transmitted over one of the plurality of lanes.

4. The method of claim 1, wherein each lane comprises a pair of differential signal wires, and wherein transmitting the sequence of symbols comprises:
providing a differential signal to each lane, the differential signal corresponding to a bit position in each symbol of the sequence of symbols.

5. The method of claim 1, wherein the sequence of symbols is transmitted without transmitting a clock signal in a dedicated clock lane on the communications link.

6. The method of claim 1, wherein transmitting the sequence of symbols comprises:
repurposing a clock lane of the communications link to carry a differential signal corresponding to one bit of symbols transmitted on the communications link.

7. The method of claim 1, wherein transmitting the sequence of symbols comprises:
using low voltage differential drivers to transmit the sequence of symbols.

8. An apparatus for multi-wire signaling, comprising:
a plurality of differential transmitters adapted to couple the apparatus to a communications link that employs differential signaling;
a first convertor that is configured to receive data to be communicated over the communications link and to convert the data to a set of transition numbers; and
a second convertor that is configured to select sequences of symbols using the transition numbers,
wherein each sequence of symbols is transmitted on the communications link using the plurality of differential transmitters,
wherein each pair of consecutive symbols in the sequences of symbols comprises two different symbols that define different signaling states of the communications link, and
wherein the second convertor is configured to embed clock information in transitions in signaling state of the communications link by selecting consecutively transmitted pairs of symbols that are different from one another.

9. The apparatus of claim 8, wherein each transition number includes at least one digit, and wherein each symbol in the sequence of symbols is selected based on a value of a digit of a corresponding transition number and an immediately preceding symbol.

10. The apparatus of claim 8, wherein the plurality of differential transmitters comprises n transmitters configured to produce 2 signaling states such that $2^n$ symbols are available for transmission on the communications link, and wherein the first convertor is configured encode data using $r = 2^n - 1$ transition numbers.

11. The apparatus of claim 10, wherein each sequence of symbols comprises m symbols, and wherein each sequence of symbols encodes data elements that have up to $(2^n-1)^m$ possible states.

12. The apparatus of claim 8, wherein the plurality of differential transmitters comprises low voltage differential transmitters.

13. The apparatus of claim 8, wherein each symbol comprises a plurality of bits, each bit controlling a signaling state output by one of the plurality of differential transmitters.

14. The apparatus of claim 8, wherein each sequence of symbols is transmitted based on timing provided by a transmit clock, and wherein the transmit clock is not transmitted in a dedicated clock lane on the communications link.

15. The apparatus of claim 8, wherein each sequence of symbols is transmitted on the communications link using low voltage differential signaling.

16. The apparatus of claim 8, wherein in a different mode of operation, one of the plurality of differential transmitters carries a clock signal and other transmitters in the plurality of differential transmitters carry signals representative of different bits of the data.

17. A receiving apparatus for multi-wire signaling, comprising:
a plurality of differential receivers configured to provide a sequence of symbols representative of signals received from a plurality of lanes in a communications link;
a clock recovery circuit adapted to generate a receive clock by detecting transitions in signaling state of the communications link, wherein the transitions in signaling state of the communications link correspond to transitions between symbols in the sequence of symbols;
a first convertor configured to generate a transition number representative of differences between consecutive symbols in the sequence of symbols, wherein the transition number includes a plurality of digits; and
a second convertor configured to decode data from the transition number,
wherein each digit of the transition number represents a difference between a symbol received by the plurality of differential receivers and an immediately preceding symbol received by the plurality of differential receivers, and
wherein each consecutive pair of symbols received by the plurality of differential receivers includes two different symbols.

18. The receiving apparatus of claim 17, wherein edges of the receive clock correspond to transitions between symbols in the sequence of symbols.

19. The receiving apparatus of claim 17, wherein the receive clock is used to capture the sequence of symbols.

20. The receiving apparatus of claim 17, wherein the clock recovery circuit generates the receive clock without using a phase-locked loop.

21. The receiving apparatus of claim 17, wherein one or more operations of the first convertor and one or more operations of the second convertor are controlled by the receive clock.

22. The receiving apparatus of claim 17, wherein plurality of differential receivers comprises low voltage differential receivers.

23. The receiving apparatus of claim 17, wherein the communications link is configured for low voltage differential signaling.

24. A method for multi-wire signaling, comprising:
receiving a sequence of symbols from a plurality of lanes in a differential signaling communications link;
extracting a receive clock corresponding to transitions between consecutive symbols in the sequence of symbols;
generating a transition number representative of differences between consecutive symbols in the sequence of symbols wherein the transition number includes a plurality of digits; and converting the transition number to data, wherein each pair of consecutive symbols in the sequences of symbols comprises two different symbols such the clock includes an edge corresponding to each symbol in the sequence of symbols, and wherein each digit of the transition number represents a difference between a symbol received from the plurality of lanes and an immediately preceding symbol received from the plurality of lanes.

25. The method of claim 24, wherein edges of the receive clock correspond to transitions between symbols in the sequence of symbols.

26. The method of claim 24, further comprising:
capturing the sequence of symbols using the receive clock.

27. The method of claim 24, the receive clock is extracted without using a phase-locked loop.

28. The method of claim 24, further comprising:
using the receive clock to control generation of the transition number; and
using the receive clock to control conversion of the transition number to data.

29. The method of claim 24, wherein the sequence of symbols is encoded in a plurality of differential signals, each differential signal being received from a different lane of the communications link.

30. The method of claim 24, wherein the differential signaling communications link employs low voltage differential signaling.

\* \* \* \* \*